US010243786B2

(12) United States Patent
Rjeili et al.

(10) Patent No.: US 10,243,786 B2
(45) Date of Patent: Mar. 26, 2019

(54) PROXIMITY AND CONTEXT AWARE MOBILE WORKSPACES IN ENTERPRISE SYSTEMS

(71) Applicant: Citrix Systems, Inc., Fort Lauderdale, FL (US)

(72) Inventors: Joe Abou Rjeili, Parkland, FL (US); Joseph L. Freedman, Sunrise, FL (US); Georgy Momchilov, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 675 days.

(21) Appl. No.: 14/172,321

(22) Filed: Feb. 4, 2014

(65) Prior Publication Data

US 2014/0344420 A1 Nov. 20, 2014

Related U.S. Application Data

(60) Provisional application No. 61/825,274, filed on May 20, 2013.

(51) Int. Cl.
*H04L 12/24* (2006.01)
*H04L 29/06* (2006.01)
(Continued)

(52) U.S. Cl.
CPC ......... *H04L 41/0803* (2013.01); *G06Q 10/10* (2013.01); *G06Q 10/109* (2013.01);
(Continued)

(58) Field of Classification Search
CPC ................................ H04L 67/10; H04L 67/18
See application file for complete search history.

(56) References Cited

U.S. PATENT DOCUMENTS 6,246,879 B1 * 6/2001 Segura .................... H04L 12/24
370/400
6,427,177 B1 * 7/2002 Chang .................... G06F 9/4411
710/10

(Continued)

FOREIGN PATENT DOCUMENTS

EP 1217792 6/2002
EP 1217792 A1 6/2002

OTHER PUBLICATIONS

The International Search Report and The Written Opinion corresponding to International Application No. PCT/US2014/037763 dated Nov. 20, 2014, 19 pages.

(Continued)

*Primary Examiner* — Lashonda Jacobs
(74) *Attorney, Agent, or Firm* — Banner & Witcoff, Ltd.

(57) ABSTRACT

Methods and systems for configuring computing devices using mobile workspace contexts based on proximity to locations are described herein. A mobile computing device determines that the device is proximate to a location, another device, or an individual associated with an enterprise system. The mobile computing device may then receive a mobile workspace context associated with the location, device, or individual, such as one or more specific wireless networks, enterprise applications, and/or documents, and may configure the device based on the received mobile workspace context. Additional methods and systems are described herein for transmitting and receiving sets of device capabilities between multiple devices, establishing communication sessions, and sharing various capabilities between devices. Still additional methods and systems are described for determining and accessing the capabilities of enterprise system resources using mobile computing devices in an enterprise system.

23 Claims, 23 Drawing Sheets

(51) Int. Cl.
*H04W 4/50* (2018.01)
*H04L 29/08* (2006.01)
*H04L 12/26* (2006.01)
*H04M 1/725* (2006.01)
*G06Q 10/10* (2012.01)
*H04W 4/02* (2018.01)
*H04W 4/04* (2009.01)
*H04N 7/14* (2006.01)

(52) U.S. Cl.
CPC .......... *H04L 43/04* (2013.01); *H04L 65/1069* (2013.01); *H04L 67/10* (2013.01); *H04L 67/18* (2013.01); *H04M 1/72569* (2013.01); *H04M 1/72572* (2013.01); *H04N 7/147* (2013.01); *H04W 4/02* (2013.01); *H04W 4/025* (2013.01); *H04W 4/04* (2013.01); *H04W 4/50* (2018.02); *H04N 2007/145* (2013.01)

(56) References Cited

U.S. PATENT DOCUMENTS

| | | | | |
|---|---|---|---|---|
| 7,620,008 | B1* | 11/2009 | Hayes | H04W 8/265 370/328 |
| 8,131,875 | B1* | 3/2012 | Chen | H04M 1/72522 707/E17.121 |
| 8,224,894 | B1 | 7/2012 | Parks et al. | |
| 8,452,847 | B2* | 5/2013 | Karaoguz | G06F 9/5055 709/217 |
| 8,515,460 | B2 | 8/2013 | Greenberg | |
| 8,588,693 | B2* | 11/2013 | Lazaridis | H04L 67/34 455/41.2 |
| 8,644,817 | B1* | 2/2014 | Ezell | H04L 65/1073 370/331 |
| 8,914,863 | B2 | 12/2014 | Prchal | |
| 8,990,273 | B2* | 3/2015 | Iarocci | H04L 67/16 455/403 |
| 9,058,583 | B2 | 6/2015 | Kempf et al. | |
| 9,143,530 | B2 | 9/2015 | Qureshi et al. | |
| 9,264,763 | B2* | 2/2016 | Kwon | H04N 21/4367 |
| 9,326,115 | B2* | 4/2016 | Kobayashi | H04W 4/18 |
| 9,547,842 | B2* | 1/2017 | De la Rosa | G06Q 10/107 |
| 2003/0065947 | A1 | 4/2003 | Song et al. | |
| 2003/0148773 | A1 | 8/2003 | Spriestersbach et al. | |
| 2003/0204582 | A1 | 10/2003 | Shimoda et al. | |
| 2003/0236890 | A1* | 12/2003 | Hurwitz | H04L 29/06 709/227 |
| 2004/0103280 | A1* | 5/2004 | Balfanz | H04W 12/04 713/169 |
| 2004/0266348 | A1* | 12/2004 | Deshpande | H04L 29/06 455/41.2 |
| 2005/0091289 | A1* | 4/2005 | Shappell | G06F 17/30067 |
| 2005/0220166 | A1 | 10/2005 | Kanai et al. | |
| 2005/0226166 | A1* | 10/2005 | Agrawal | H04L 67/2828 370/252 |
| 2006/0258289 | A1 | 11/2006 | Dua | |
| 2007/0236727 | A1* | 10/2007 | Proust | H04L 12/5692 358/1.15 |
| 2008/0046984 | A1 | 2/2008 | Bohmer et al. | |
| 2008/0096544 | A1* | 4/2008 | McNamara | H04L 65/4023 455/424 |
| 2009/0012806 | A1 | 1/2009 | Ricordi et al. | |
| 2009/0111378 | A1 | 4/2009 | Sheynman et al. | |
| 2009/0215477 | A1* | 8/2009 | Lee | H04L 12/5895 455/466 |
| 2009/0286506 | A1 | 11/2009 | Gu et al. | |
| 2009/0315678 | A1 | 12/2009 | Padmanabhan et al. | |
| 2010/0100620 | A1* | 4/2010 | Sathish | H04W 8/22 709/224 |
| 2010/0214419 | A1 | 8/2010 | Kaheel et al. | |
| 2010/0216441 | A1 | 8/2010 | Larsson et al. | |
| 2010/0257251 | A1* | 10/2010 | Mooring | H04W 4/206 709/216 |
| 2010/0325625 | A1* | 12/2010 | Diaz | H04L 12/24 717/176 |
| 2011/0060999 | A1* | 3/2011 | So | G06F 9/452 715/740 |
| 2011/0081923 | A1* | 4/2011 | Forutanpour | G06F 1/1694 455/457 |
| 2011/0106954 | A1 | 5/2011 | Chatterjee et al. | |
| 2011/0167357 | A1 | 7/2011 | Benjamin et al. | |
| 2012/0008557 | A1* | 1/2012 | Wu | H04W 8/22 370/328 |
| 2012/0016961 | A1 | 1/2012 | Tuikka | |
| 2012/0019365 | A1 | 1/2012 | Tuikka et al. | |
| 2012/0023240 | A1* | 1/2012 | Kwon | H04N 21/4367 709/227 |
| 2012/0069132 | A1 | 3/2012 | Kato | |
| 2012/0084472 | A1* | 4/2012 | Locascio | H04L 12/2829 710/104 |
| 2012/0092277 | A1* | 4/2012 | Momchilov | G06F 3/038 345/173 |
| 2012/0173257 | A1 | 7/2012 | Preiss et al. | |
| 2012/0227092 | A1 | 9/2012 | Smith | |
| 2013/0080616 | A1* | 3/2013 | Tsui | H02J 7/0055 709/223 |
| 2013/0091440 | A1* | 4/2013 | Kotler | G06Q 10/10 715/753 |
| 2013/0104041 | A1 | 4/2013 | Seshagiri et al. | |
| 2013/0125031 | A1 | 5/2013 | Calica et al. | |
| 2013/0222839 | A1 | 8/2013 | Armstrong | |
| 2013/0288719 | A1 | 10/2013 | Alonzo | |
| 2013/0293458 | A1 | 11/2013 | Jayachandran et al. | |
| 2013/0303085 | A1* | 11/2013 | Boucher | H04W 4/008 455/41.1 |
| 2013/0314214 | A1* | 11/2013 | Leica | H04W 4/80 340/10.1 |
| 2013/0318159 | A1* | 11/2013 | Earnshaw | H04N 1/00347 709/204 |
| 2013/0346329 | A1 | 12/2013 | Alib-Bulatao et al. | |
| 2014/0006620 | A1* | 1/2014 | Assuncao | H04M 1/72569 709/226 |
| 2014/0007222 | A1 | 1/2014 | Qureshi et al. | |
| 2014/0055488 | A1 | 2/2014 | Masters | |
| 2014/0059129 | A1* | 2/2014 | Chumbley | G06F 17/30876 709/204 |
| 2014/0074537 | A1* | 3/2014 | Bargetzi | G08C 17/02 705/7.19 |
| 2014/0089416 | A1 | 3/2014 | Wang | |
| 2014/0094160 | A1* | 4/2014 | Patil | H04L 12/2834 455/418 |
| 2014/0100997 | A1 | 4/2014 | Mayerle et al. | |
| 2014/0108084 | A1 | 4/2014 | Bargetzi et al. | |
| 2014/0133712 | A1 | 5/2014 | Boncyk et al. | |
| 2014/0141714 | A1* | 5/2014 | Ghosh | H04L 29/08 455/39 |
| 2014/0149859 | A1 | 5/2014 | Van Dyken et al. | |
| 2014/0181302 | A1* | 6/2014 | Sahoo | H04L 67/303 709/225 |
| 2014/0237015 | A1* | 8/2014 | Bruins | H04W 52/0209 709/201 |
| 2014/0269658 | A1* | 9/2014 | Sadasivam | H04W 72/0406 370/338 |
| 2014/0313282 | A1 | 10/2014 | Ma et al. | |
| 2015/0199193 | A1 | 7/2015 | Balasubramanian et al. | |
| 2015/0370909 | A1* | 12/2015 | Volach | G06Q 30/0269 707/722 |
| 2016/0037048 | A1* | 2/2016 | Earnshaw | H04N 5/23203 348/211.2 |
| 2016/0294889 | A1 | 10/2016 | George | |
| 2017/0006162 | A1 | 1/2017 | Bargetzi et al. | |
| 2017/0300669 | A1 | 10/2017 | Strom et al. | |

OTHER PUBLICATIONS

Apr. 8, 2016—U.S. Non-final Office Action—U.S. Appl. No. 14/251,016.
Dec. 7, 2016—(EP) First Examination Report—App 14734969.0.
The International Preliminary Report on Patentability and The Written Opinion corresponding to International Application No. PCT/US2014/037763 dated Dec. 3, 2015, 14 pages.

(56) References Cited

OTHER PUBLICATIONS

Apr. 20, 2017—U.S. Final Office Action—U.S. Appl. No. 14/251,016.
Nov. 20, 2014 (PCT) International Search Report—App 2014037763.
Aug. 25, 2017—U.S. Final Office Action—U.S. Appl. No. 14/251,016.
Jan. 12, 2018—U.S. Non-Final Office Action—U.S. Appl. No. 14/251,016.
Jul. 26, 2018—U.S. Notice of Allowance—U.S. Appl. No. 14/251,016.

* cited by examiner

PROXIMITY AND CONTEXT AWARE MOBILE WORKSPACES IN ENTERPRISE SYSTEMS

CROSS-REFERENCE TO RELATED APPLICATIONS

This application claims priority to U.S. Provisional Patent Application Ser. No. 61/825,274, filed May 20, 2013, and entitled "Proximity and Context Aware Mobile Workspaces in Enterprise Systems," the contents of which are incorporated by reference in their entirety in this disclosure.

BACKGROUND

Mobile devices, such as smart phones, personal digital assistants, tablet computers, other types of mobile computing devices, are becoming increasingly popular. Mobile devices are used in personal and business settings for a variety of purposes. Additionally, many people have multiple computing devices, including one or more mobile devices. A user's different devices may be in different locations and may have different physical device capabilities. For example, a user may have a desktop computer with a standard keyboard and mouse interface, a mobile device with a touch screen interface and voice recognition capabilities, a laptop computer with a fingerprint scanner interface, and so on.

Computing devices of all types, including mobile devices, are used widely in the consumer world as well as the business world. Users of computing devices may want their devices to be personal and interactive, and suitable both as personal consumer devices and as business devices. Additionally, many users frequently change both their physical location and their work context, for example, between home, a workplace office, conference room, offsite work location, commuting environment, and other locations. When changing physical locations and/or work contexts, users may switch between different devices, applications, security zones, and networks, in order to perform different personal and work-related tasks.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards configuring mobile computing devices using mobile workspace contexts associated with various locations in an enterprise system. In certain examples, a mobile computing device may determine that is located proximate to a location associated with an enterprise system. A mobile computing device may use, for instance, near field communication tags, a Global Positioning System (GPS) receiver, Bluetooth, WiFi or other location beacons, device cameras, scanners, and/or other techniques to determine that the device is proximate to a physical location, such as a conference room or office, an object or device, such as printer, projector, or other device, or an employee or other person associated with an enterprise system. The mobile computing device may then receive mobile workspace context associated with the location, device, or individual, for example, from an enterprise server. In various embodiments, mobile workspace contexts may include one or more specific wireless networks, enterprise applications, and/or specific documents associated with the location. The mobile computing device may then be configured based on the received mobile workspace context. For instance, the mobile computing device may be configured to establish a connection to a wireless network associated with the location, or to enable access to various applications and/or specific documents associated with the location.

According to additional aspects of the disclosure, a first computing device may determine that is located proximate to second computing device. The first computing device may transmit a set of device capabilities to the second computing device and/or may receive a set of device capabilities from the second computing device. After transmitting and/or receiving device capabilities, a persistent communication session may be established between the computing devices, and one or more device capabilities may be shared between the devices. In certain examples, the shared capabilities may correspond to input or output capabilities of the devices, such as display screen characteristics, connected peripherals, microphones, touch screens, and other device capabilities. In some embodiments, user input may be received authorizing one-way or two-way sharing of device capabilities, and/or identifying one or more specific capabilities to be shared. According to additional aspects, device capability sharing may be performed between three or more devices during the same time window.

Further aspects of the disclosure relate to determining and accessing the capabilities of an enterprise system resource using a mobile computing device in an enterprise system. In various examples, a mobile computing device may capture data using a camera, scanner, near field communication data reader, or the like, and may use the captured data to identify a specific enterprise system resource. For instance, a mobile device camera and optical character recognition capabilities may be used to identify a device, such as a printer, scanner, or projector associated with an enterprise system. In other examples, the enterprise system resource may correspond to location, such as an office or conference room, or an employee badge or office placard identifying a specific individual associated with the enterprise system. After determining the enterprise system resource, the mobile device may retrieve and access a set of associated capabilities from an enterprise server. For instance, if the enterprise system resource is a device, the mobile device may receive network connection data or device driver software from an enterprise server. In other examples, the mobile device may receive and access scheduling data and/or a set of capabilities or devices associated with the enterprise system resource.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards proximity aware and context aware devices that may be configured to change configurations of networks, applications, documents, and the like, depending on a detected location or proximity. Additional aspects described herein are directed towards devices sharing data and capabilities with other devices, for example, by advertising and discovery of capabilities, and pairing of devices. Devices may communicate directly via peer-to-peer communication and/or via an enterprise system, such as a cloud system, so that the desired capabilities from each device may be combined in a single application and single computing session. Still further aspects are directed towards identifying objects or other entities within an enterprise system (e.g., resources in a company domain), such as an employee, office or conference room, or a device such as a computer server or printer. Features and capabilities associated with an identified object may be retrieved from various enterprise resources and provided to a user via a client agent application, e.g., CITRIX® RECEIVER®, on a client device.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
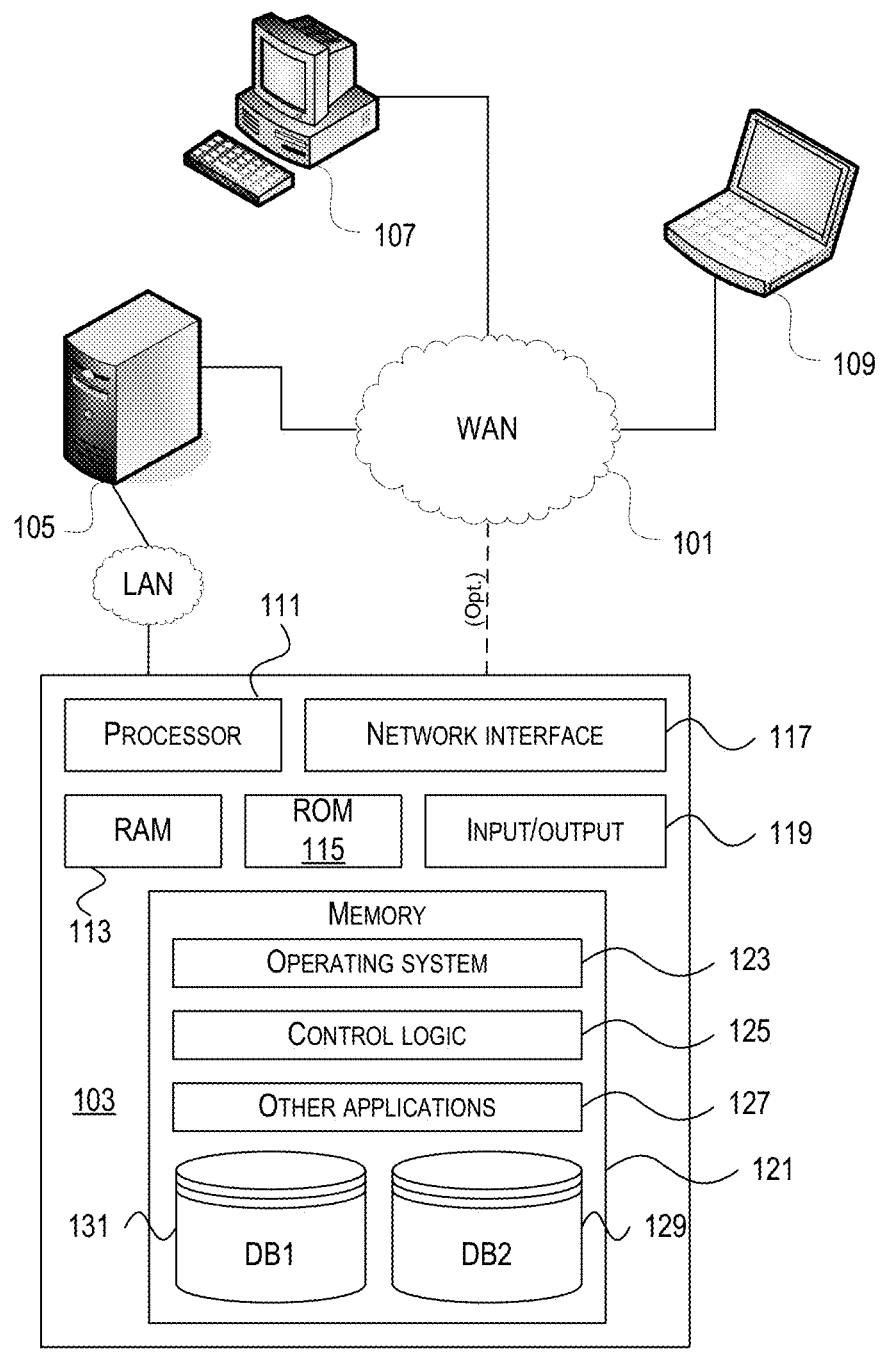
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MANs), wireless networks, personal networks (PANs), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
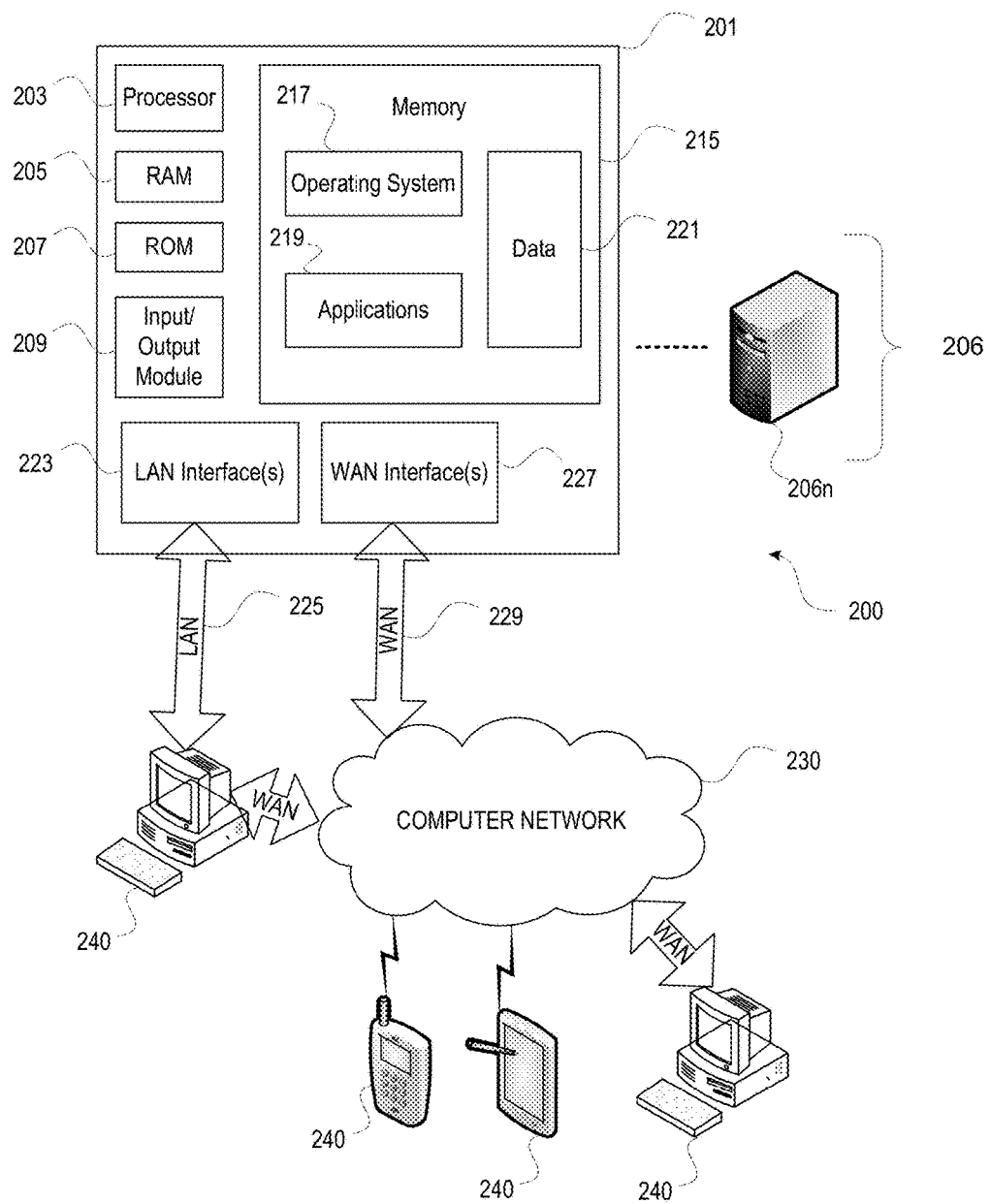
FIG. 2 depicts an illustrative remote-access system architecture that may be used in accordance with one or more illustrative aspects described herein.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

When utilized in a desktop virtualization system, server 206 may be configured as virtualization server in a virtualization environment, for example, a single-server, multi-server, or cloud computing environment. In such embodiments, the virtualization server 206 may include a hardware layer including one or more physical disks, physical devices, physical processors, and physical memories. The memory 215 of the virtualization server 206 may include firmware, an operating system, and a hypervisor (e.g., a Type 1 or Type 2 hypervisor) configured to create and manage any number of virtual machines. A virtual machine is a set of executable instructions that, when executed by a processor, imitate the operation of a physical computer such that the virtual machine can execute programs and processes much like a physical computing device. The hypervisor may provide each virtual machine with a virtual view of the physical hardware, memory, processor and other system resources available to that virtual machine.

Some aspects described herein may be implemented in a cloud-based environment. In such environments, client devices 240 may communicate with one or more cloud management servers 206 to access the computing resources (e.g., host servers, storage resources, and network resources) of the cloud system. Cloud management servers 206 may manage various computing resources, including cloud hardware and software resources, and may provide user interfaces through which cloud operators and cloud customers may interact with the cloud system. For example, management servers 206 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. Management servers 206 also may include a set of APIs and/or one or more customer console applications with user interfaces configured to receive cloud computing requests from end users via client computers 240, for example, requests to create, modify, or destroy virtual machines within the cloud. Client computers 240 may connect to management server 206 via the Internet or other communication network, and may request access to one or more of the computing resources managed by management server 206. In response to client requests, the management server 206 may include a resource manager configured to select and provision physical resources in the hardware layer of the cloud system based on the client requests. For example, the management server 206 and additional components of the cloud system may be configured to provision, create, and manage virtual machines and their operating environments (e.g., hypervisors, storage resources, services offered by the network elements, etc.) for customers at client computers 240, over a network (e.g., the Internet), providing customers with computational resources, data storage services, networking capabilities, and computer platform and application support. Cloud systems also may be configured to provide various specific services, including security systems, development environments, user interfaces, and the like.

Cloud computing environments also may include virtualization layer with additional hardware and/or software resources configured to create and manage virtual machines and provide other services to customers using the physical resources in the cloud. The virtualization layer may include hypervisors, as described above, along with other components to provide network virtualizations, storage virtualizations, etc. The virtualization layer may be as a separate layer from the physical resource layer, or may share some or all of the same hardware and/or software resources with the physical resource layer.

Enterprise Mobility Management Architecture

Figure 3:
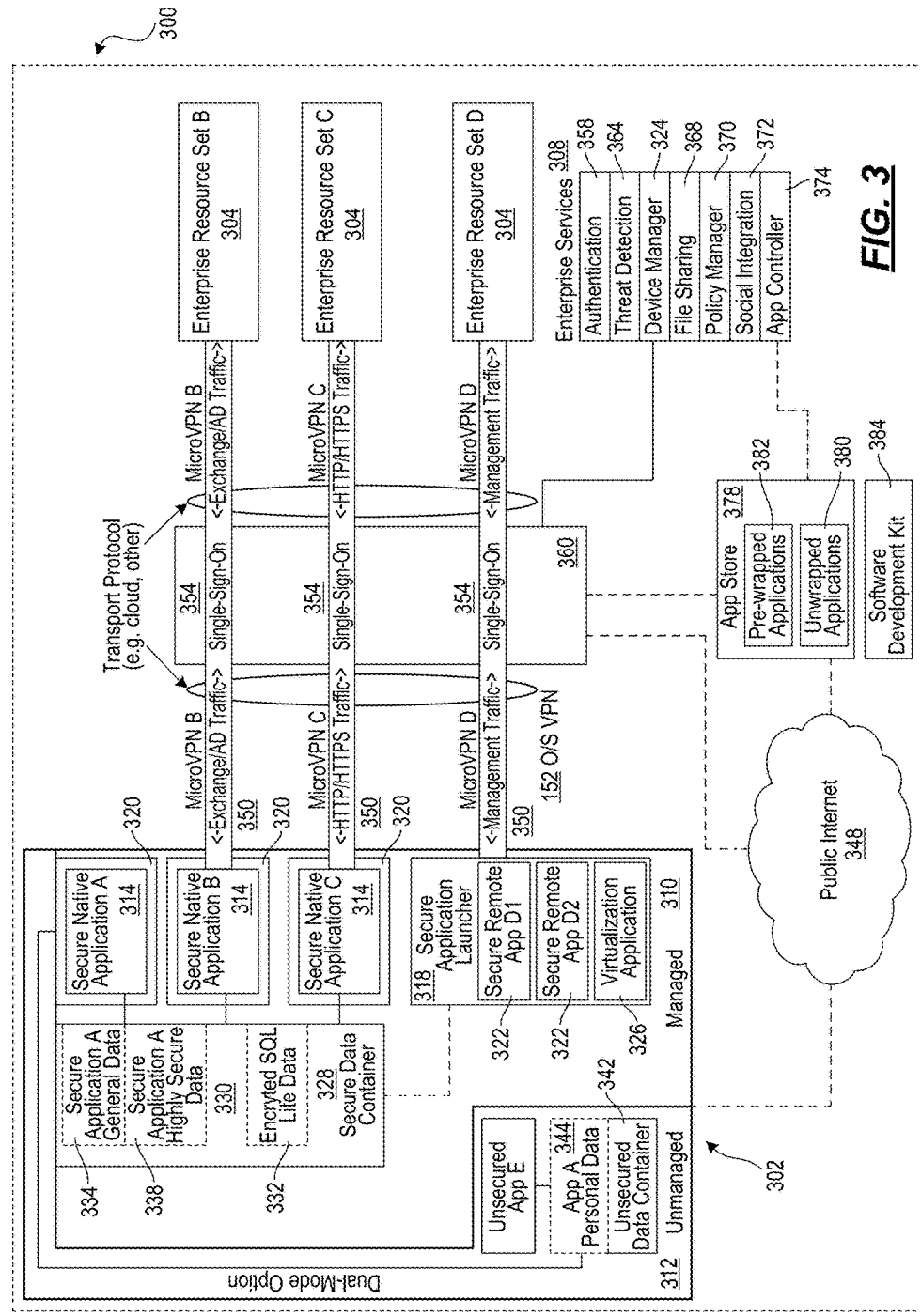
FIG. 3 depicts an illustrative enterprise mobility management system in accordance with one or more illustrative aspects described herein.

FIG. 3 represents an enterprise mobility technical architecture 300 for use in a BYOD environment. The architecture enables a user of a mobile device 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to the user. The user may utilize the mobile device 302 for business use only or for business and personal use. The mobile device may run an iOS operating system, Android operating system, and/or the like. The enterprise may choose to implement policies to manage the mobile device 304. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

The operating system of the mobile device may be separated into a managed partition 310 and an unmanaged partition 312. The managed partition 310 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as AES 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured mode. In an unsecured mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications 348 that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections (also referred to at microVPN or application-specific VPN) may be specific to particular applications 350, particular devices, particular secured areas on the mobile device, and the like (e.g., 352). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use user interface. The application store 378 may provide access to a software development kit 384. The software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
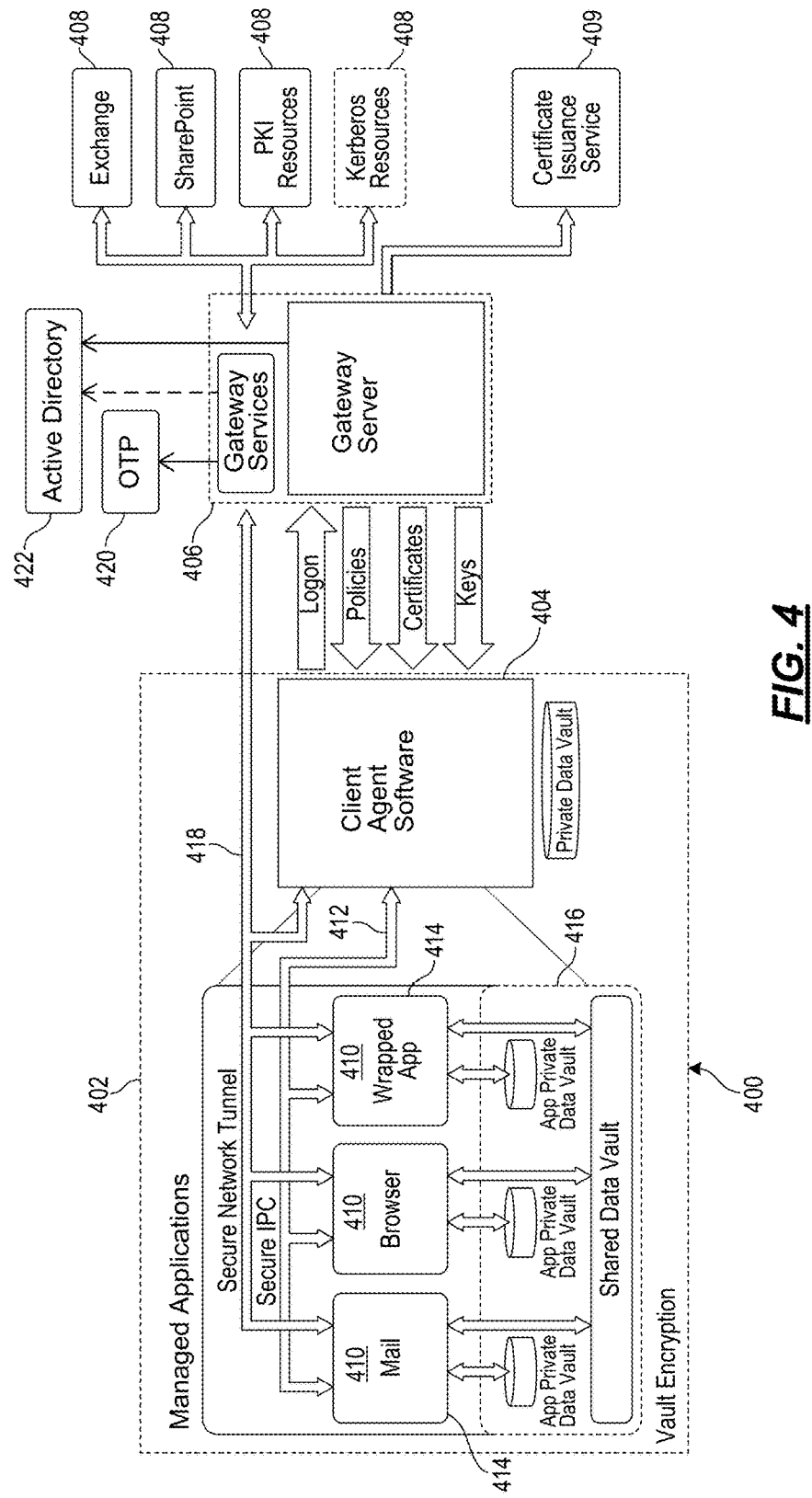
FIG. 4 depicts another illustrative enterprise mobility management system in accordance with one or more illustrative aspects described herein.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled/managed mobile device 402 with a client agent 404, which interacts with gateway server 406 (which includes access gateway and application controller functionality) to access various enterprise resources 408 and services 409 such as Exchange, Sharepoint, PKI Resources, Kerberos Resources, and Certificate Issuance Service, as shown on the right hand side above. Although not specifically shown, the mobile device 402 may also interact with an application store for the selection and downloading of applications.

The client agent 404 acts as the UI (user interface) intermediary for Windows apps/desktops hosted in an Enterprise data center, which are accessed using a display remoting protocol, such as but not limited to the ICA protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and the application management framework (AMF) of this architecture act to provide policy driven management capabilities and features such as connectivity and SSO (single sign on) to enterprise resources/services 408. The client agent 404 handles primary user authentication to the enterprise, normally to the access gateway (AG) with SSO to other gateway server components. The client agent 404 obtains policies from gateway server 406 to control the behavior of the AMF managed applications 410 on the mobile device 402.

The secure IPC links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through access gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The mail and browser managed applications 410 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 406 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password. When data is stored locally on the device 402 in the secure container 416, it is preferred that a minimum of AES 256-bit encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want the enterprise application store to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via a micro VPN feature). For example, an email application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to AD 422, using an AD password or trusted client certificate, and obtain Kerberos service tickets to respond to HTTP negotiate authentication challenges. The limited support feature relates to constrained delegation in AGEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include remote wipe functionality even when an application 410 is not running.

A multi-site architecture or configuration of the enterprise application store and application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Proximity and Context Aware Mobile Workspaces

Figure 5:
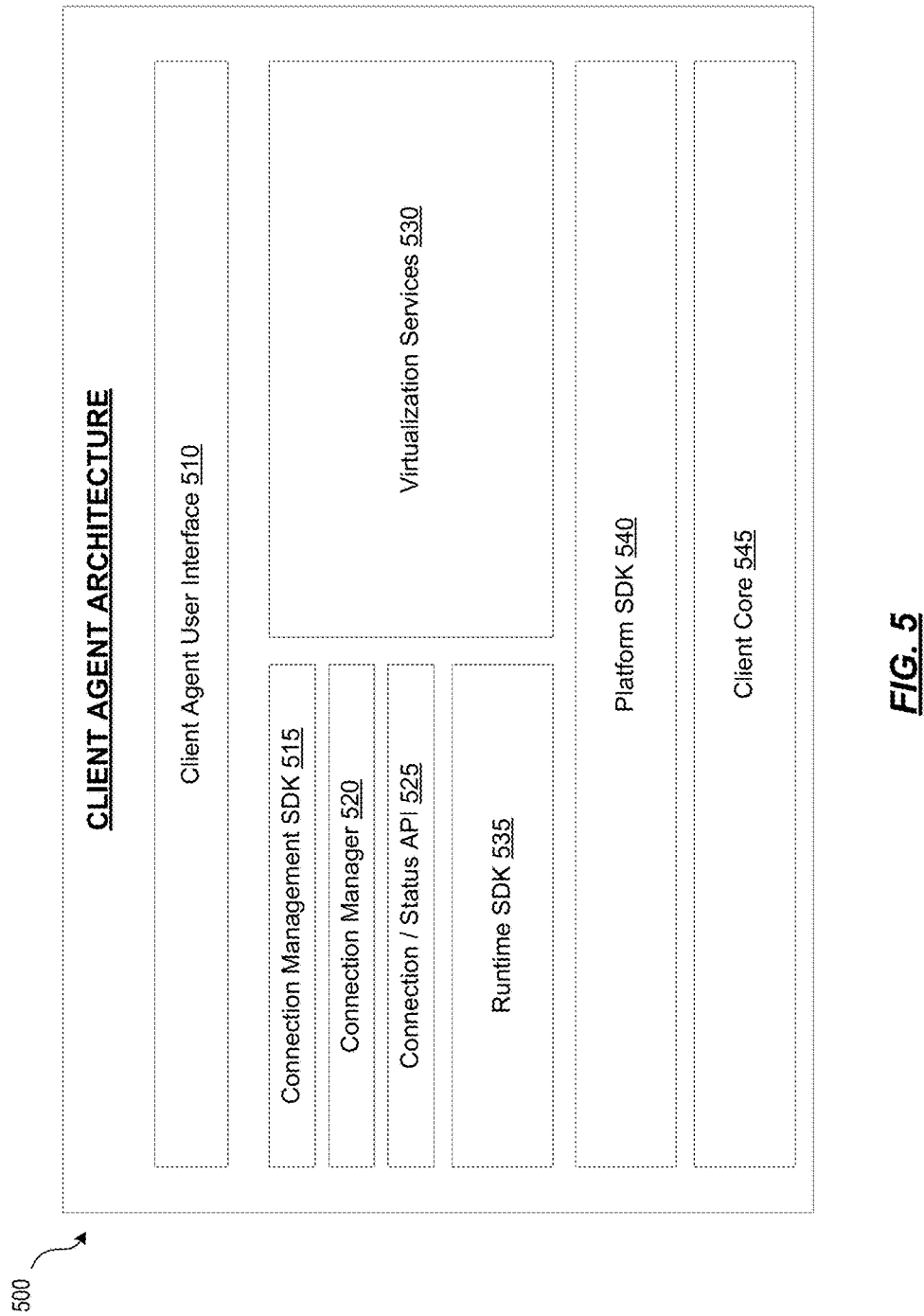
FIG. 5 depicts an illustrative architecture for a client agent software component of a client device, in accordance with one or more illustrative aspects described herein.

FIG. 5 is a component diagram illustrating the architecture for an example client agent application 500 within a client device. The example client agent 500 may correspond to the client agent 404 described above or to another client agent software application configured to execute on a client device and to communicate with remote resources, such as a cloud system or other enterprise system. As discussed below in reference to FIGS. 6-15, the client agent 500 may include various functionality to implement proximity and location awareness, configuration of the client device based on a determined context, sharing of data and capabilities between various devices, identification of objects, and accessing features or capabilities associated with the object via an enterprise system.

The software architecture of the client agent 500 in this example includes a client agent user interface component 510, a connection management software development kit (SDK) 515, a connection manager 520, a connection/status application programming interface (API) 525, a set of virtualization services 530, a runtime SDK 535, a platform SDK 540, and a client core 545. The user interface component 510 may include various subcomponents to support user authentication, communication with an access gateway 360 or 406, an application enumeration function, support for application launching, roaming, and XML/HTTPS support. The user interface component 510 also may include a self-service and application selection subcomponent, and may include the underlying functionality for the client agent user interfaces presented to users of the client device.

The virtualization service 530 in the client agent architecture 500 may include, for example, a graphics service, a desktop integration service, a multimedia service, input/output services, a smart card service, a printing service, and the like. The runtime SDK 535 may be, for example, Independent Computing Architecture (ICA) runtime SDK, including an ICA engine. The platform SDK 540 may be, for example, an ICA platform SDK or other platform SDK, and may include various subcomponents such as a virtual channel SDK, a configuration and load manager, a trace subcomponent, a platform abstraction SDK, and the like. The client core 545 may include, for example, a core protocol for remote access to terminal services (e.g., a Winstation driver with a core ICA protocol), a reducer subcomponent configured to perform compression and prioritization, a multistream ICA, a TCP stack with session reliability, proxy, and SSL, and a UDP subcomponent. The client core also may include implementations of platform-specific subcomponents, such as graphics smart card and thread support, configuration and load manager libraries, an SSL SDK, and the like.

Figure 6:
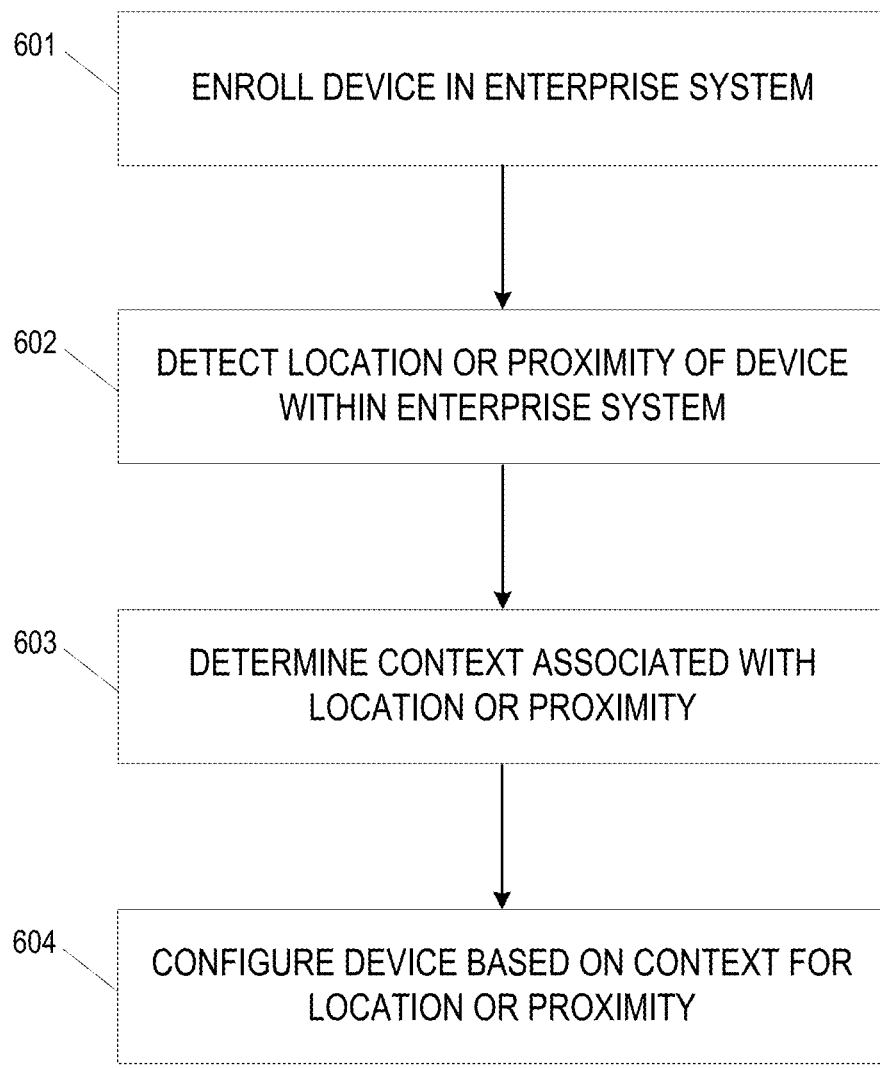
FIG. 6 is a flow diagram illustrating an example process of configuring a client device based on a context associated with a location or proximity, in accordance with one or more illustrative aspects described herein.

FIG. 6 is a flow diagram illustrating example features and methods relating to configuring a client device with an appropriate context (e.g., via the client agent 500 for accessing an enterprise system) based on a location of the device or a proximity of the device to other devices, people, or objects.

In step 601, a client device may be enrolled in an enterprise system. As discussed above, an enrolled device may refer to a device that is managed through the application of device management policies. For example, in an enrolled client device 402, a client agent 404 may interact with a gateway server 406 or other access gateway to access various enterprise resources 408 and services 409. Enrolling a device may involve bring your own device (BYOD) and related technologies. Enrollment of a device with a company account (or other organization account) may involve pushing certificates to the device and registering the device with a device management server of an enterprise system. After enrollment, the device may be "governed" by a company administrator (or other organization administrator) using mobile device management (MDM) and/or application management framework (AMF) policies that are pushed to the device. In certain examples, to enroll a device in an enterprise system, a client agent 500 and/or an application enrollment token may be downloaded and installed on the device. The application enrollment token may be derived from a certificate of a company or other organization to which the device will be enrolled. After downloading the client agent 500 and application enrollment token, the device user may be prompted to open the token and add the company account (or other organization account) to the device.

In certain embodiments, a client agent 500 may be installed on a device as a line of business (LOB) application (e.g., a company application). As discussed below, a client agent 500 and/or application enrollment token may be installed by a near field communication (NFC) tag, or may be installed from an application store where the installation is facilitated by an NFC tag. In such cases, the client agent 500 may be downloaded and an operating system prompt on the device may be used to install the client agent 500 as a company application.

When the client agent 500 is installed as a line of business application for a company/organization, the device user may be presented with application store information and/or recommended applications via the client agent 500. For example, the client agent 500 may be configured to present the company application store and recommended company applications to the user during the user's first time use (FTU) of the client agent application. In some cases, an NFC tag on a poster or other object may be used to provide the client agent 500 with application store information and recommended applications.

In some embodiments, voice commands and/or dictation may be used with the client agent 500. Various commands may be spoken to launch or close the client agent application, published applications, and/or documents. Additional voice commands may be used to search for applications or content, and add or remove items from a favorites list. Dictation may be used for input into or control of various remote applications, documents, and the like. Additionally, the client agent 500 may be configured to provide voice feedback to actions taken by users, for example, using text-to-speech translation technologies.

In step 602, a current location of the client device, or a proximity of the client device to other objects or devices, is detected. The detection of the location or proximity of the client device in step 602 may be performed by the client device itself, other nearby objects or devices, and/or other resources within an enterprise system. An absolute device location or relative device location may be determined based on a position, a proximity to or detection of other devices, objects or networks. Such proximity determinations may include specific states or dispositions of these entities or collections of entities, whether they are previously known or just discovered, and the like.

In some cases, the location of a device may be detected using near field communication tags. As discussed below, a user may tap the mobile device to an NFC tag (e.g., on a door, wall, or poster) to establish proximity to the NFC tag, and thereby determine the location of the device. Bluetooth, Wi-Fi, and other proximity based technologies also may be used to establish the location of a device relative to another device or object. For example, a current location of a mobile computing device may be determined using a beacon or Bluetooth Low Energy (BLE) receiver of the mobile computing device in some cases. Additionally, Global Positioning System (GPS) technology may be used to determine the location of the device, without needing to determine the proximity of the device to any other device or object. A device location also may be determined using Image Pattern Recognition (IPR), Optical Character Recognition (OCR), or the like. For example, an internal camera on the device may capture an image of a sign or object, such as building name or address, conference room number, or the like, and then use IPR or OCR technology to analyze the data and determine the location of the device based on the captured data.

In step 603, a context may be determined associated the device location or proximity detected in step 602. A context may correspond to one or more factors of a mobile workspace in an enterprise system. For example, a context may correspond to a particular network, such as a home network of the device user, public shared network, company or organization network, and the like. The context also may correspond to whether the device will be configured to have internal or external access to an application store (e.g., a company application store) associated with the network. Additionally, a context also may include a list of applications (e.g., company or enterprise applications) that will be available to the device and/or automatically launched on the device, along with predetermined configurations for the various applications. A context also may correspond to one or more specific documents that will be available and/or automatically launched on the device during a mobile workspace session.

In step 604, the device may be configured in accordance with the context determined in step 603, based on the location or proximity of the device. For example, the device may be configured to automatically switch networks based on the determined context, such as between a home network and work network, or vice versa. When a context corresponds to one or more sets of applications and/or documents, the client agent 500 may be configured to provide the applications/documents via an enterprise system. That is, the client agent application 500 on a client device may control which company applications or enterprise applications the user will be able to access, based on the location or proximity of the device detected in step 602. Additionally, certain contexts may correspond to automatically launching specific applications or documents on devices. Thus, in step 604, the client agent 500 may configure and/or launch certain applications automatically on the device, and may open specific documents on the device, corresponding to the context determined in step 603.

As an example to further illustrate steps 601-604, a client device may be a user's personal and/or work device, such as mobile phone, tablet or laptop computer, or other computing device. The client device may be detected at a company conference room at the user's workplace, using the proximity or locational techniques discussed above. After the client device is detected at the company conference room, the device may be configured to connect to the company's network, and to launch (via the client agent 500) a set of applications and/or documents that are likely to be needed by the user for a meeting in that conference room, such as a note taking application, presentation application, video conferencing application, and the like. Further, the client agent 500 may be configured to access the user's calendar and/or scheduling data to determine the type or purpose of the meeting (e.g., an accounting meeting, a production meeting, a human resources meeting, etc.) and may select a context based on the specific meeting type and/or the identities of other meeting participants.

As another example, the client device may be device used by a doctor, nurse, or medical technician to provide medical treatment at a hospital or other medical facility. In this example, a detected location may correspond to a patient's room, operating room, or office. After the device is detected at a patient's room, a context corresponding to the patient's room may be retrieved, including patient-specific data, charts, and applications relative to the patient's treatment, and the device may be configured in accordance with the context so that the determined data and applications (e.g., patient-specific applications and data) are immediately available to the device user.

Figure 7:
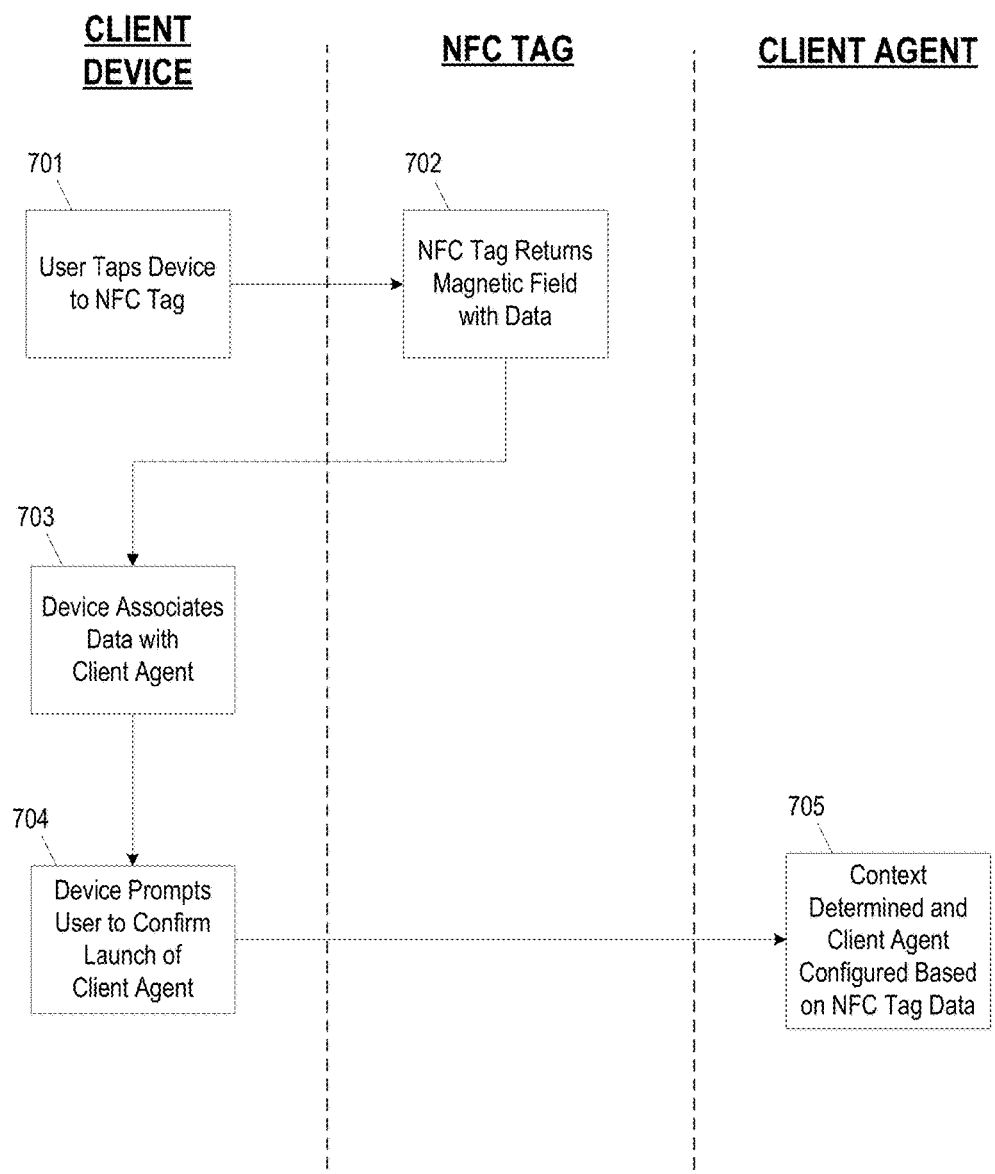
FIG. 7 is a diagram illustrating an example technique of configuring a client device with a client agent based on a context associated with an NFC tag, in accordance with one or more illustrative aspects described herein.

FIG. 7 is a flow diagram illustrating an example in which a client device may be configured with a context associated with an NFC tag. The steps of FIG. 7 may correspond to one or more specific examples of steps 601-604, where a fixed location NFC tag (e.g., mounted on a wall, in a room, etc.) is used to determine the location of the device and transmit the context to the device.

In step 701, a device user may observe an NFC tag and tap the device to the NFC tag to initiate the configuration process. In step 702, the NFC tag may transmit data back to the device via a magnetic field. If the NFC tag is an unpowered NFC tag, the device may emit an electromagnetic field that powers the NFC tag. A powered NFC tag, in contrast, may transmit data without needing an electromagnetic field emitted from a device. The data transmitted back to the device in step 702 may be, for example, location data, data identifying an object, or context data associated with the NFC tag. For instance, if the NFC tag is at a fixed location, such as a building lobby, conference room, office, and the like, the tag may transmit the location of the NFC tag (e.g., building name, floor number, room number, locational coordinates, etc.) in step 702. In some cases, rather than location information, the NFC tag may transmit context information (e.g., network information, a list of available company or enterprise applications or documents, application configuration settings, etc.). Additionally, certain NFC tags may be mobile, such as NFC tags fixed onto vehicles, files or records, patients or beds in hospitals, and other mobile objects. In such examples, NFC tags might not transmit location information, but instead may transmit an object or entity identifier (e.g., file name, vehicle ID, patient name, etc.) from which context data may be determined. In still other examples, various computing devices (e.g., mobile phones, tablet and laptop computers, etc.) may have NFC transmission capabilities, and thus may perform the same function as powered NFC tags.

In step 703, the client device receives data (e.g., mobile workspace context data) from the NFC tag and associates the received data with the client agent application 500. Transmissions from various types of NFC tags may be used by different applications on the client device. Thus, the client device may be configured to identify the type of NFC data as being associated with a client agent application 500 and/or an enterprise system. For example, an operating system of a mobile device may be configured to recognize an App ID within the NFC data and associate the App ID with the client agent application 500. At the time the NFC data is received by the client device, the client device may or may not already have a client agent application 500 installed, and may or may not already be enrolled in an enterprise system. Thus, in step 703, after receiving the NFC data associated with the client agent and/or enterprise system, the client device may be configured to initiate an installation of a client agent application 500, and enrollment of the device to an enterprise system, if these functions have not previously been performed for the device. For example, mobile workspace context data received in step 703 may correspond to identifier of a first enterprise device or application management framework, and a client agent application 404 in the mobile computing device may be configured to enroll the mobile computing device with the first enterprise device or application management framework.

In step 704, assuming the client device already has a client agent 500 installed, and is already enrolled in an enterprise system, the client device may be configured to launch the client agent application 500. In some cases, the operating system may be configured to first determine whether the client agent application 500 is already running on the client device. If not, the operating system may prompt the user to confirm that client agent 500 should be launched. In other examples, the operating system of the client device may be configured to automatically launch client agent 500 after receiving the NFC data, without needing any additional confirmation from the device user.

In step 705, the client agent application 500 is launched, and the NFC data is passed from operating system as arguments to the client agent application 500, so that the client agent 500 may determine a context and configure the client agent based on the NFC data. As discussed above, the context data, including networks, applications, configurations, documents, and the like, may be transmitted within the NFC data itself. Alternatively the NFC data may comprise of a URL pointing to context data stored remotely, such as at a gateway or other remote device of an associated enterprise system. Alternatively, the NFC data may include only location information or other identification information from which the context may be determined by the client agent 500. For example, if the NFC data corresponds to location data (e.g., a room identifier, object identifier, etc.), then the client agent 500 may access a lookup table to retrieve the appropriate context (e.g., networks, applications, documents, etc.) associated with the location data. When performing such a looked up to retrieve context table, the lookup tables may be stored locally on the client device or may be stored remotely, such as at a gateway or other remote device of an associated enterprise system.

In certain embodiments, data transmitted from NFC tags, other location or proximity data techniques discussed above (e.g., Bluetooth, Wi-Fi, OCR, IPR, etc.) in a company or organization context may correspond to an application store URL, user account information, and/or one or more application identifiers. In such examples, the client device may provide such data to the client agent 500 (e.g., as arguments or parameters), which the client agent 500 may process and analyze in step 705. For instance, if the NFC tag data (or other data) contains an application store URL, the client agent 500 may be configured to check for an existing store configuration corresponding to the application store URL. The application store URL in this example may correspond to an application store 378 of a company or other organization. If client agent 500 has an existing store configuration matching the application store URL, the client agent 500 then may prompt the user for authentication credentials to login to the application store corresponding to the URL. If client agent 500 does not have an existing store configuration matching the application store URL, the client agent 500 first may remove the store from the client device memory, and add a new store using the provided application store URL, before prompting the user for authentication credentials to login to the application store.

As other example, if the client agent 500 receives data containing an application store URL and a user account via an NFC, the client agent 500 may first check for an existing store configuration corresponding to the application store URL. If the existing store configuration on the client device matches the application store URL, the client agent 500 then may check whether the user account on the client device associated with the application store URL matches the user account data provided via the NFC tag. If the user account on the client device matches the provided user account data, the user may be automatically logged into the application store using the existing user account on the client device. If the account on the client device associated with the application store URL does not match the account data provided via the NFC tag, the client agent 500 may be configured to remove the account and add a new account on the client device corresponding to the application store URL. In this case, the client agent 500 may be configured to prompt the device user for a valid password corresponding to the user account provided via the NFC tag (e.g., prepopulating the username and/or domain name field), before logging the user in to the application store.

In another example, the data received by the client agent 500 in step 705 (NFC tag data or other location/proximity data) may include an application store URL and/or a user account, as well as a list of application IDs. In this example, the client agent 500 may authenticate the user and log the user on to the application store as described in the examples above. After the user has been successfully logged in to the application store, the client agent 500 may enumerate applications through the provided list of application IDs, and for each application ID the client agent 500 may automatically subscribe the user to the application associated with the application ID.

In yet another example, the data received by the client agent 500 in step 705 (NFC tag data or other location/proximity data) may include an application store URL and/or a user account, as well as a single application ID. In this example, the client agent 500 may authenticate the user and log the user on to the application store as described in the examples above. After the user has been successfully logged in to the application store, the client agent 500 may identify the company application or enterprise application associated with the application ID, and may automatically launch the application on the client device.

Figure 8A:
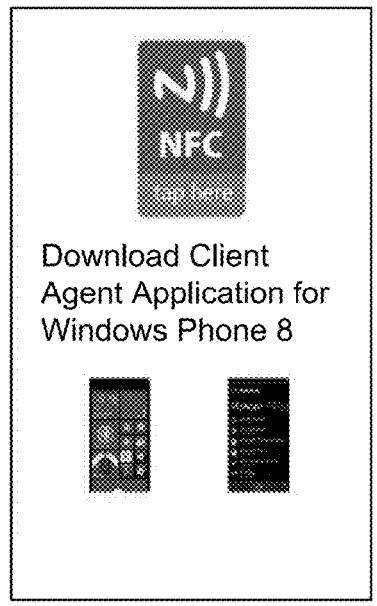
FIGS. 8A-8L are example user interfaces and related figures for transmitting context data from an NFC tag to a mobile client device and configuring a client agent on the mobile client based on the context data, in accordance with one or more illustrative aspects described herein.
Figure 8B:
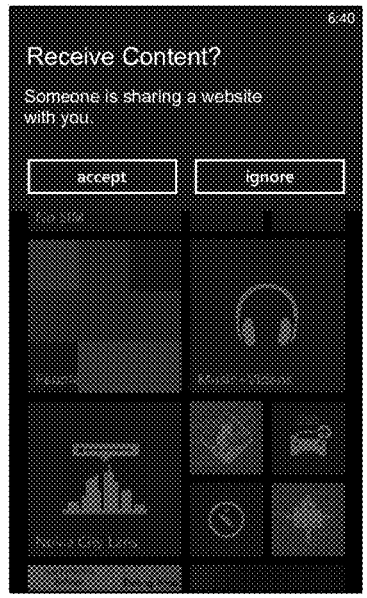
Figure 8C:
Figure 8D:
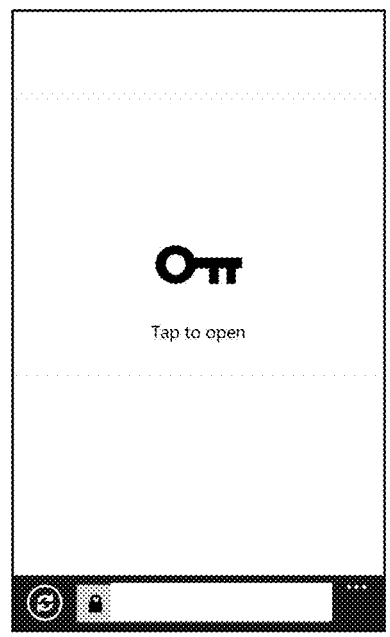
Figure 8E:
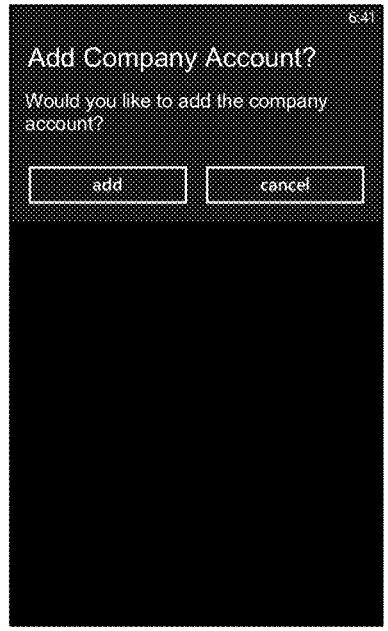
Figure 8F:
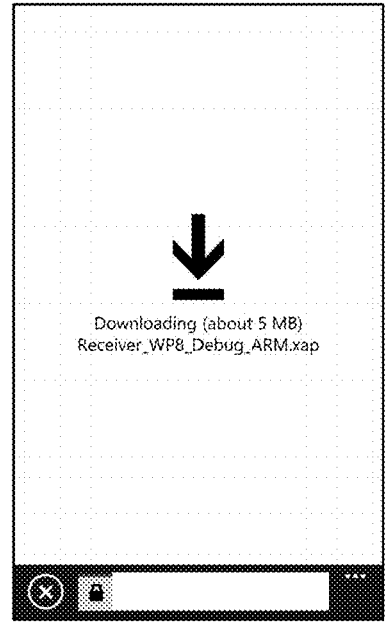
Figure 8G:
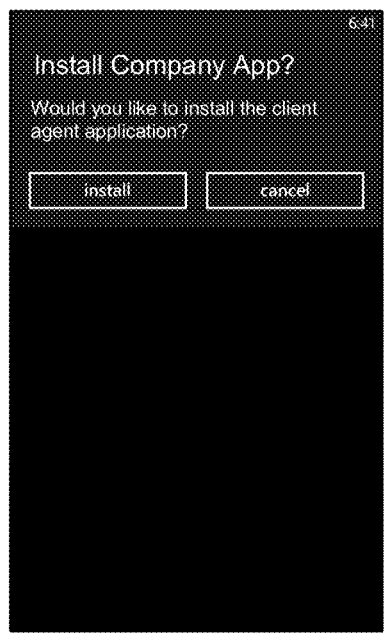
Figure 8H:
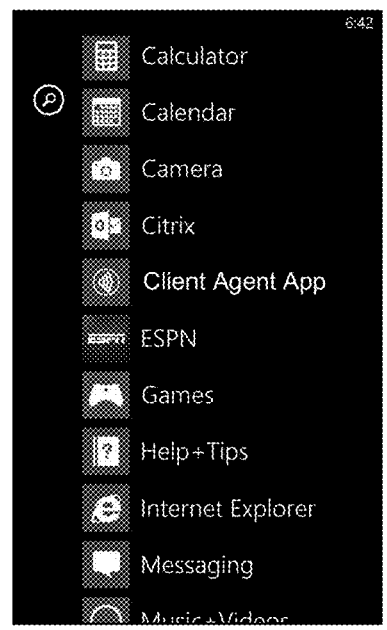

FIGS. 8A-8L are example user interfaces and related figures for transmitting context data from an NFC tag to a mobile client device and configuring a client agent application 500 on the client device based on the received context data. FIG. 8A shows an example of a poster with an NFC tag that may be used to enroll a client device and download a client agent application 500. FIG. 8B shows an example operating system message prompting the mobile device user to receive content from the NFC tag shown in FIG. 8A. In FIG. 8C, an example user interface screen is shown corresponding to a download screen of a web page pointed to by the NFC tag shown in FIG. 8A. The download screen shown in FIG. 8C allows the user to download an application enrollment token and/or a client agent application to the computing device. The application enrollment token in this example may be derived from the company certificate or other organization certificate. FIG. 8D is an example user interface screen prompting the user to open the application enrollment token. FIG. 8E is an example operating system message prompting the device user to add the company account to the mobile device. FIG. 8F is an example user interface screen showing the client agent application being downloaded to the mobile device. FIG. 8G is an example operating system message prompting the user to install the client agent application as a company application. FIG. 8H is an example user interface showing the client agent application successfully installed.

Figure 8I:
Figure 8J:
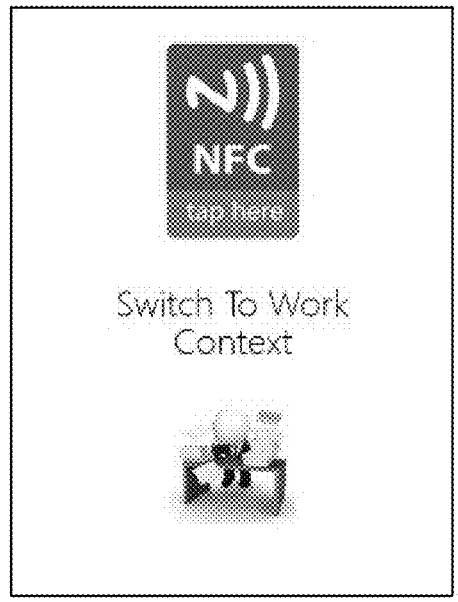
Figure 8K:
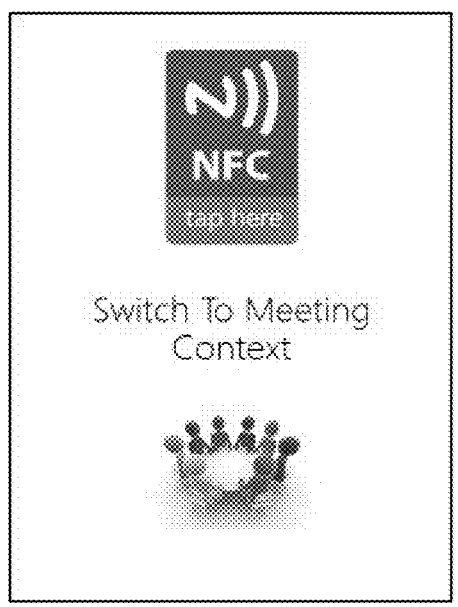
Figure 8L:

FIG. 8I shows an example of a poster with an NFC tag that may be used to receive application store information and recommended company applications by a client device. After the client device has installed the client agent 500 and the device has been enrolled in an enterprise system, the user may tap the client device to the poster in FIG. 8I to subscribe to one or more applications, for example, during a first time use after enrolling the device. FIGS. 8J, 8K, and 8L show examples of posters with NFC tags that may be used to change the context of an enrolled device between a work context (FIG. 8J), a meeting context (FIG. 8K), and a home context (FIG. 8L). As discussed above, each context may correspond to a network (e.g., home network or work network), a set of device and/or application configurations, a set of available applications and/or automatically launched applications, a set of available documents and/or automatically launched documents, and the like. In these examples, the data transmitted from the NFC tag to client device may be passed to the client agent application 500, and then used by the client agent 500 as described above in step 705.

Sharing Data and Capabilities Among Multiple Devices

Figure 9:
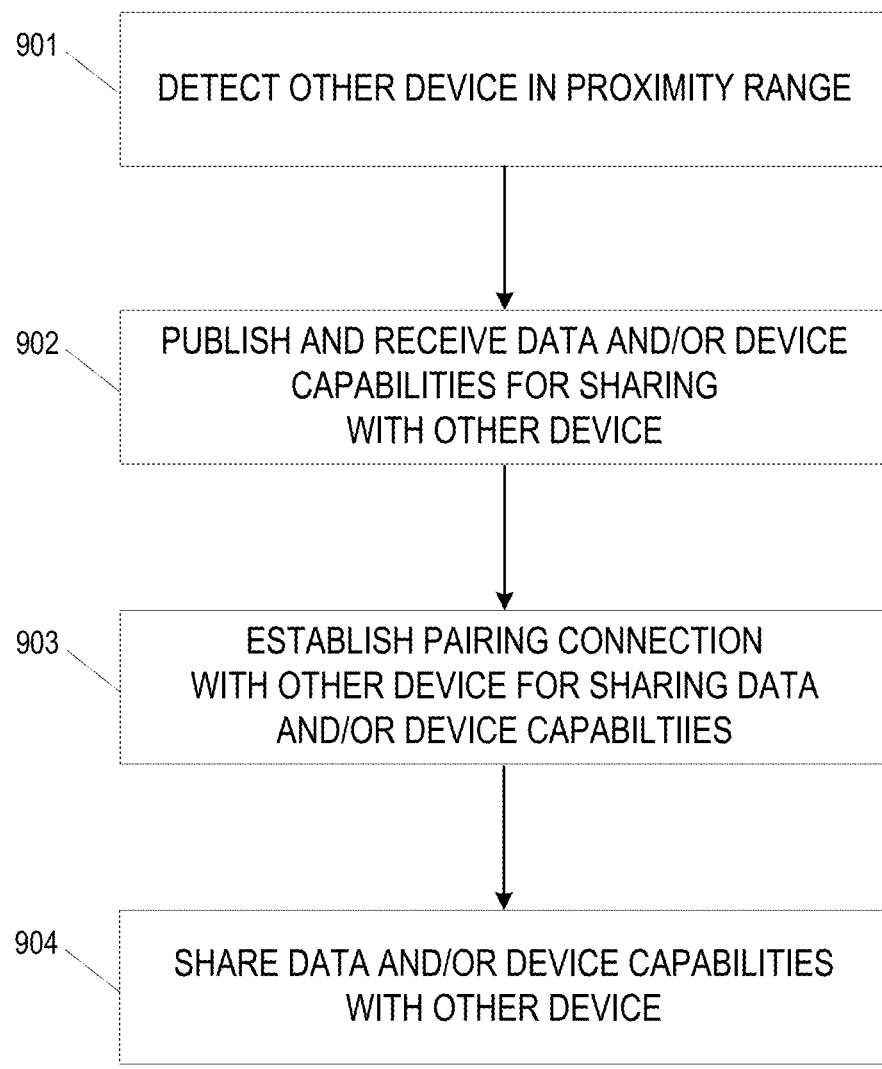
FIG. 9 is a flow diagram illustrating an example process of sharing data and capabilities among multiple devices, in accordance with one or more illustrative aspects described herein.

FIG. 9 is a flow diagram illustrating example features and methods relating to communication between devices and configuring multiple devices to share data and/or device capabilities. In this example, the communication between devices may be performed using a client agent application 500 on each device, or other software configured to support device communication and data sharing. In various examples, data and capabilities may be shared between devices enrolled in a common enterprise system, such as devices accessing the same company network and domain, having company accounts, common company applications, and the like. In other examples, devices sharing data and capabilities need not be enrolled into the same enterprise system, or any enterprise system at all. Rather, a client agent 500 or other software application may be configured to perform device detecting, communication, and sharing of data and capabilities, without any communication with or authentication to any enterprise system.

In step 901, a first computing device (e.g., mobile device 302 or 402) may detect a second computing device within a proximity range of the first device. A variety of different communication protocols and techniques may be used to detect a nearby device and establish communication in step 901. For example, one or more devices may be configured to send and receive data via near field communication (NFC), Bluetooth, or Wi-Fi communication. The proximity range at which one device may detect another may be based on the type of data communication technologies and protocols used. When the devices are configured to communicate via NFC, users may tap devices together to allow the devices to detect one another and establish communication. The detection and communication range for Bluetooth-enabled devices may depend on the class and type of device as well as various other conditions, and in some cases may range between 10-20 meters or more. Wi-Fi connections, which may include either direct Wi-Fi transmissions between the devices or indirect communications using Wi-Fi infrastructure, may have much longer ranges.

As shown in some examples, a device data sharing or capability sharing solution may be designed and implemented for devices in close proximity. For example, a finite set of data may be sent/received via NFC by the client agents 500 on the respective devices, thereby requiring the devices to be near one another during the finite period of communication (e.g., for one-time transmissions of data between devices). In other examples, an NFC transaction may be used to establish communication between devices, after which a long-lived connection stream may be established (e.g., using Bluetooth, Wi-Fi direct, or Wi-Fi infrastructure) to support a sustained communication session (e.g., for sharing device capabilities over a period of time). In such examples, nearby physical proximity may be required to initially establish a communication session (using NFC), but the close physical proximity need not be maintained after the initial NFC transaction, thus allowing the users to move their devices to different rooms, buildings, etc., while still maintaining a long-lived communication session for data or capabilities sharing. Additionally, in other examples, the devices need not ever be in close physical proximity to establish or maintain a communication session. For example, two devices (e.g., 302 or 402) enrolled in the same enterprise system may detect one another, and establish and maintain communication sessions via an access gateway (e.g., 360 and 406) and/or other enterprise system services or resources. Thus, although the example shown in FIG. 9 may apply to devices within a proximity range, this step may be optional and a proximity range may not be required in other cases.

In step 902, the first device may identify what type of data it is willing and able share with the second device, and may receive corresponding information from the second device. As discussed above, in some examples, a finite data set may be transmitted between the devices, such as a document, media file, contact, application, or any other data. Thus, in step 902 the device user may identify the specific file or files that the user would like to transmit to the other device. In other examples, longer-lived communication sessions may be supported to share larger amounts of data, ongoing streams of data, and/or to share device capabilities with other devices. In these examples, the device user may identify the data files, data streams, and/or device capabilities in step 902. In some cases, the client agent application 500 may be configured to communicate with the device operating system to determine the device capabilities, and may automatically publish the device capabilities (via NFC or other technique) to the other nearby devices detected in step 901. The data transmitted by a first device in step 902 may include data identifying one or more application sessions executing at the first device, and data transmitted by the second device may include data identifying one or more application sessions executing at the second device.

Device capabilities may include, for example, the input and output features and capabilities of the device, such as number and size of display screens, touch screen functionality, peripheral input or output devices (e.g., traditional keyboard, telephone keypad, mouse, printer, camera, etc.), video display capabilities, camera capabilities, microphone and speech recognition capabilities, and the like. As discussed below, device capabilities may be shared between multiple devices to allow users to leverage the useful features on each device in combination. For example, a mobile device 402 supporting voice recognition, user voice control, and having a touch screen, may share those capabilities with a desktop or laptop computer having a larger screen size and better video display capabilities than the mobile device 402. In this example, by sharing the capabilities of the two devices, the user may enjoy the features and advantages of both devices working within a single application and a single computing session.

As described above, the device capabilities that may be published and received in step 902, and ultimately shared between multiple devices, may include various input and output capabilities, such a display screens, audio and video input/output features, peripheral devices, and the like. However, the device capabilities shared need not be limited to input and output capabilities, and may include additional features such as processing power, memory/storage capabilities, GPS capabilities, network interfaces, device drivers, applications, and the like. For instance, a mobile device 402 (e.g., mobile phone or tablet computer) may have a desirable display screen, mobility, and user interface capabilities to allow a user to run a specific software application, but the mobile device 402 may lack the processing power, memory, or other capabilities for efficiently executing the application. In this example, processing capabilities and storage capabilities may be shared from a desktop computer or server to the mobile device 402, allowing the mobile device 402 to execute the application and display the results on the mobile display screen.

In step 903, the first mobile device may establish a pairing (e.g., a persistent communication session) with a second mobile device, and in step 904 data and/or device capabilities may be shared between the devices. In some cases, before pairing the devices the client agent 500 of one or both devices may initiate a prompt to allow the user to confirm that the devices may be paired. Certain prompts also may allow users to select and confirm the specific data (e.g., files, data streams) or specific device capabilities that may be shared with the other device. For devices enrolled in an enterprise system, verification and/or authentication using the enterprise system resources, such as the access gateway and active directory may be used to authenticate the device users before pairing the devices.

Sharing of data and device capabilities may be one-way or two-way, depending on the configurations of the devices 402 and client agents 500, the selections made by the users during the sharing process, and the access permissions of the users (when authentication is required). For example, a user may wish to set up a communication session to share capabilities between multiple of his/her devices, such as the user's mobile phone, tablet computer, and desktop computer. In this case, the devices may automatically determine the user account and authentication credentials are the same on each device, and may automatically allow two-way sharing access for all data and capabilities between the devices. On the other hand, a user wishing to share data or device capabilities with another user's device during a meeting or collaborative work session may permit only one-way sharing of data or capabilities, or may permit only certain data or capabilities to be shared between the devices (e.g., display mirroring only but no input capability sharing, or mouse and keyboard capability sharing only but not voice control, etc.). As discussed above, transmitting a first set of device capabilities from a first device to a second device in step 902 may include transmitting data identifying one or more application sessions executing at the first device. In such cases, establishing a pairing between the devices may include starting these application sessions on the second device and/or terminating these application sessions on the first computing device. In certain examples, some or all of these application sessions may be virtual (or hosted) application sessions, and starting the application sessions at the second device may include configuring a client agent application 404 on the second device to allow access to the one or more virtual/hosted application sessions.

In configurations of two or more paired devices that are connected and configured to share data and device capabilities, one or more of the devices may accept and arbitrate user input from all of the devices in the configuration. For instance, a first device in a multi-device sharing configuration may receive and handle its own user input data as well as receiving and handling user input data from other sharing devices over the established persistent communication sessions. The arbitration of input data may result in certain input data being dropped, for example, if the input data from one device is incompatible with concurrent input data from another device, or the designated outputs of the multi-device sharing configuration, or is otherwise incompatible with the established multi-device sharing configuration. Additionally, user input may be converted from one device to another in a sharing configuration. User inputs from one device may be adapted to the form factor and capabilities of other devices. For instance, mouse input data (e.g., mouse events) from a first device may be converted to touch input data (e.g., touch gestures) recognizable by a paired mobile phone or tablet computer with a touch screen, or vice versa. In other examples, touch input data from one device may be converted to keyboard input data in another device, or vice versa, voice input data from one device may be converted to text input data in another device, or vice versa, motion or orientation input data from one device may be converted to other input data in another device, or vice versa, and so on.

Figure 10:
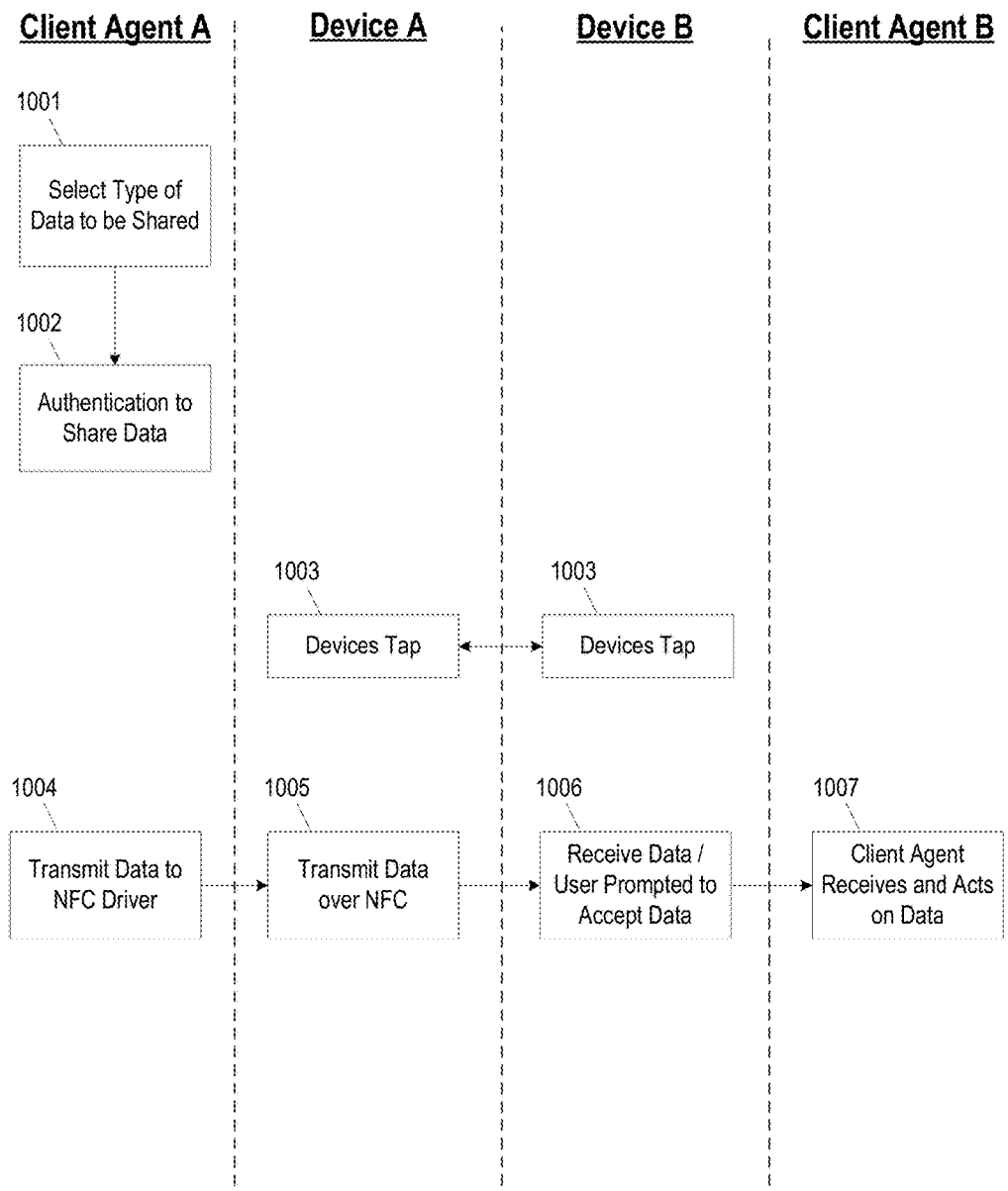
FIGS. 10-11 are diagrams illustrating example techniques for sharing data and capabilities among two devices, in accordance with one or more illustrative aspects described herein.

FIG. 10 is a flow diagram illustrating an example in which a first device (Device A) uses a client agent application 500 (Client Agent A) to share data via NFC with a second device (Device B) using a second client agent application 500 (Client Agent B). The steps of FIG. 10 may correspond to one or more specific examples of steps 901-904, where NFC communication is used for a one-time data transfer between two devices located in close physical proximity. In this example, Device A and Device B both may be NFC-compatible devices having a client agent application 500 installed. In some cases, the client agent application 500 in Device A (the data sharer) may be configured, while it may be optional to configure the client agent application 500 in Device B (the data sharee).

In step 1001, a user of Device A selects, via the client agent 500, a type of data to be shared. User interface elements within the client agent 500 may allow the user to select types of data and/or specific data files to be shared with Device B. For instance, an application command bar or a settings charm provided by a mobile phone operating system may allow the user to select the type of data to be shared and may prepare the device for sharing. In some cases, the data identified to share in step 1001 may include files/applications stored locally on Device A, and in other cases the data may include remote files/applications, such as remote data in an enterprise system accessible to Device A over a communication network. In step 1002, if necessary, the client agent 500 may prompt the user for authentication credentials and may verify the authenticity of the user's credentials before allowing the user to share data. For example, remote files accessible via a file sharing service 368 may require the user of Device A to authenticate (via a challenge and response) before the files can be downloaded and shared with Device B.

In step 1003, Device A and Device B are tapped together. In some cases, a tap confirmation may be provided by the operating system to client agent 500 in one or both of the devices. Such confirmations may or may not be presented to the device users. After the client agent 500 of Device A determines that the devices have been tapped together (e.g., by receiving a tap confirmation), the Device A client agent 500 may transmit the data to be shared to the NFC driver of Device A in step 1004.

In step 1005, the NFC driver of Device A may transmit the shared data to Device B via NFC. A device-to-device NFC transmission may be similar (or identical) to a tag-to-device NFC transmission, discussed above. In both cases, the NFC transmission may include a platform identifier and/or an application identifier to allow the receiving device (Device B) to determine the destination application for the incoming data. In the case of device-to-device NFC transmission, the transmitting device may invoke a software function (e.g., using NdefLaunchAppRecord class) to create a packet of data that will be sent to the other device (e.g., using the ProximityDevice class). For instance, the client agent 500 may instantiate the NdefLaunchAppRecord class, invoke the AddPlatformAppId( ) function on the class, and then may pass platform ID and application ID values to the function as string parameters (e.g., "WindowsPhone" and "{d1fe9221-3305-4864-98fe-13ba1d27aaa6}." In this example, the arguments field of the instantiated NdefLaunchAppRecord object may be set to the payload string. The NdefLaunchAppRecord object may be checked for validity using the CheckIfValid( ) function. If it is valid, a new NdefMessage object may be created, taking the NdefLaunchAppRecord object as a parameter. The ProximityDevice class object then may send the NdefMessage object using the PublishBinaryMessage( ) function.

In step 1006, Device B may receive the NFC data and (optionally) prompt the device user to confirm that the received data should be accepted by the device. After the user confirms the acceptance of the data, Device B may parse the NFC data to determine the application identifier (corresponding to the client agent application 500 in this case), and then may pass the data to the client agent application 500. If the client agent 500 on Device B is not already instantiated, it may be automatically launched by the operating system of Device B in response to the receipt of the NFC data. After the client agent 500 on Device B is launched, or if it is determined that the client agent 500 is already running, the payload of the NFC data transmission may be passed from the NFC driver of Device B to the client agent 500.

In step 1007, the client agent 500 of Device B receives the NFC data as arguments, parses the arguments, and acts on the data. The client agent 500 may be configured to perform different actions depending on the data received. As discussed above, the NFC data may correspond to one or more files, applications, or other data sent from Device A to Device B. In some examples, the NFC data sent from Device A to Device B may be similar (or identical) to NFC data sent from NFC tags to devices, discussed above. For instance, the data transmission in step 1005 may include an application store URL and/or a user account, and a list of one or more application IDs. In these examples, the receiving device (Device B) may receive and process the data in the same ways discussed above in step 705.

Figure 11:
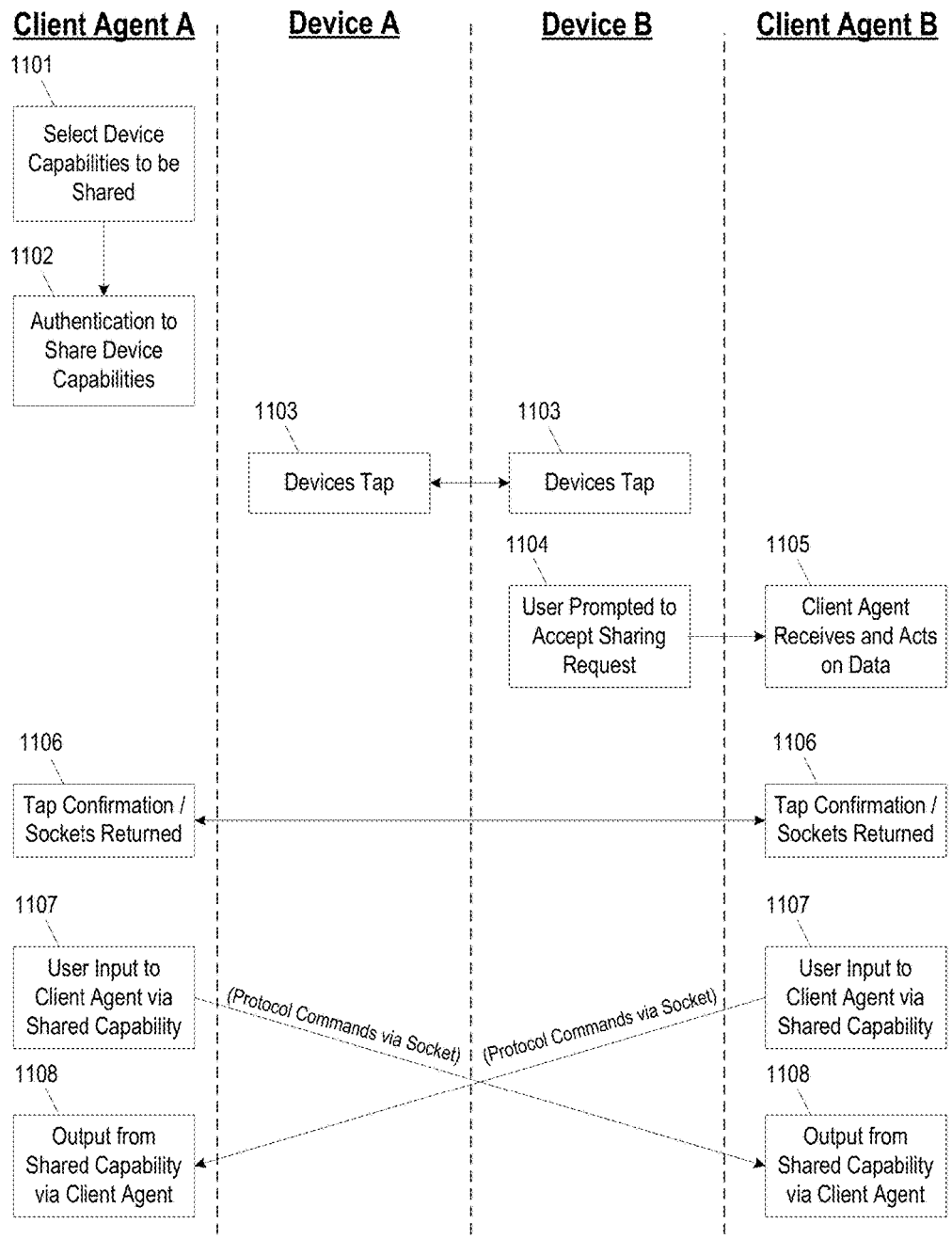

FIG. 11 is a flow diagram illustrating an example in which a first device (Device A) uses a client agent application 500 (Client Agent A) to establish a communication session and share device capabilities with a second device (Device B) using a second client agent application 500 (Client Agent B). The steps of FIG. 11 may correspond to one or more additional examples of steps 901-904, where NFC communication is used to initiate communication between two devices located in close physical proximity, after which a sustained communication session may be established to share device capabilities. In this example, both Device A and Device B may be NFC-compatible, Bluetooth-compatible, and/or Wi-Fi-compatible devices having a client agent application 500 installed and configured.

In step 1101, a user of Device A selects, via the client agent 500, a set of device capabilities to be shared with Device B. User interface elements within the client agent 500 may allow the user to select various device capabilities, such as input and output capabilities and other device capabilities discussed above. For instance, an application command bar or a settings charm provided by a mobile phone operating system may allow the user to select the device capabilities to be shared and may prepare the Device A for sharing. In some cases, the client agent 500 may require a user confirmation and/or user authentication before allowing the device capabilities identified in step 1101 to be shared. Thus, in step 1102 (optional), the client agent 500 may prompt the user for authentication credentials and may verify the authenticity of the user's credentials before allowing the user to share device capabilities. After the client agent 500 has prepared Device A for sharing device capabilities, Device A may enter a peer discovery state.

In step 1103, Device A and Device B may be tapped together. In response to the tapping of the devices, an NFC message may be sent from Device A to Device B. The NFC message sent in step 1103 may contain an application identifier header and a payload, as discussed above in 1005. In step 1104, Device B may receive the NFC data and (optionally) prompt the device user to confirm that the received data should be accepted by the device. As described above in step 1006, the operating system of Device B may receive and parse the NFC message to determine the application identifier contained in the message (corresponding to the client agent application 500 in this case), may launch the client agent application 500 if necessary, and then may pass the payload as arguments to the client agent 500 of Device B. In step 1105, the client agent 500 of Device B receives the NFC data as arguments, parses the arguments, and acts on the data. Device B now may enter the peer discovery state.

In step 1106, after both Device A and Device B have entered the peer discovery state, a long-lived connection stream between Device A and Device B may be established. A long-lived connection stream in this example may use one or more of the following protocols: Bluetooth; Wi-Fi direct (e.g., devices communicate directly with each other over IEEE 802.11); or Wi-Fi infrastructure (e.g., devices communicate indirectly with each other over IEEE 802.11 via a router or other network devices). In some examples, one or both of the devices may require a tap confirmation by the device user before the long-lived connection stream can be established. After the connection stream is established between the devices in step 1106, a socket for communicating via the connection stream may be provided to the client agent application 500 in each device.

In steps 1107 and 1108, after the connection stream has been established, the client agent 500 of Device A may use the connection socket and appropriate protocol to send data to the client agent 500 of Device B, and vice versa. As discussed above, the data sent in step 1107 and received in step 1108 may correspond to user input data (e.g., keyboard data, mouse data, touch screen data, voice data, etc.) received at Device A and sent to Device B (or vice versa), to be received and processed by Device B as though the data were input by a user directly into Device B. The data sent in step 1107 also may correspond to output data (e.g., display screen output, audio output, etc.) generated at Device A and sent to Device B (or vice versa), to be received and output on Device B.

In some examples involving device-to-device long-lived communication sessions, a software class, such as the PeerFinder class, may be used. For instance, when an event (e.g., a TriggeredConnectionStateChanged event) is raised on a PeerFinder object with the state of TriggeredConnectState-.Completed, a StreamSocket object may be provided. A DataWriter may be created using the OutputStream of the provided StreamSocket object, and a DataReader may be created using the InputStream of the provided StreamSocket object. The DataReader and DataWriter may be configured on both DeviceA and DeviceB for bi-directional communication. In some examples, if only single-directional communication is desired, then the DataWriter may be configured only on one device, and the DataReader may be configured only on the other device.

In some cases, when data is transmitted between Device A and Device B using DataWriter and DataReader, a limited number of data types may be written to the DataWriter, for example, string data and image. These types may correspond to constants transmitted in a data type field along with the payload of the data transmission. It may be assumed that Device B has an active session when string data is sent, and it may be assumed that Device A has an active session when image data is sent. DeviceB may be configured to continuously read data from the DataReader until canceled. DeviceB also may react differently depending on the type of data sent. For example, if image data is read, the image will be shown on the display screen of Device B. However, if string data is read, Device B may react differently depending on the source of the string data. For instance, if DataWriter and DataReader support only string data and image, then when string data is received by Device B, the string data may correspond to keyboard data or voice data. For certain devices, keyboard data may be sent one keystroke at a time, so that the payload of a data transmission may consist of that keystroke only. For some devices, the keystroke data in the payload may be prepended with a predetermined identifier string (e.g., "Keystroke") to identify the payload string as keystroke data. In these examples, when Device B receives keyboard data, the keystrokes contained in the payload may be inserted into the active session of the client agent application 500 on Device B.

As noted above, in some cases string data may indicate either keystroke data or voice data. Voice data may include dictation or commands, and certain devices may allow users to choose between a dictation mode and a command mode. In some cases, dictation mode and command mode may operate simultaneously and a user's utterance may be interpreted as either text dictation or command. In some cases, a voice command or dictation by a user into Device A may be converted into a text string and may be written to DataWriter for transmission to Device B. For either dictation mode or command mode, a predetermined identifier string (e.g., "Dictation" or "Command") may be prepended to the converted voice string. When Device B receives command or dictation voice data, it may strip off the prepended identifier string (e.g., "Dictation" or "Command"), and analyze the string data. If the received voice data is identified as command data, the payload string also may be converted to lowercase and may be checked against a list of known commands. If the command is recognized, it may be converted to a particular keystroke sequence, and that keystroke sequence may be inserted into the active session of the client agent application 500 on Device B. In some cases, a voice command may be directed to Client Agent B (e.g., instruct client agent 500 on Device B to go to its home screen, enumerate applications, search for a document, etc.). In some cases, a voice command may be directed to Device B and applied by Client Agent B (e.g., instruct client agent 500 on Device B to increase volume on Device B, increase screen brightness, launch another native application 314 or 410, shut down Device B, etc.).

When transmitting image data via DataWriter, Device A may take raw pixel data (e.g., from the D2DSurface) used to render in-session graphics. Device A then may compress the raw pixel data (e.g., using the GZipStream class) and may write the compressed byte array to the DataWriter. This process may occur every time the client agent application 500 receives new graphics data to display. When Device B receives the corresponding image data using DataReader, it may decompress the byte array, add a bitmap header, and then display the image on Device B. In some cases, the protocol for sending image data may be extended to allow for different resolutions between Device A and Device B.

Figure 12A:
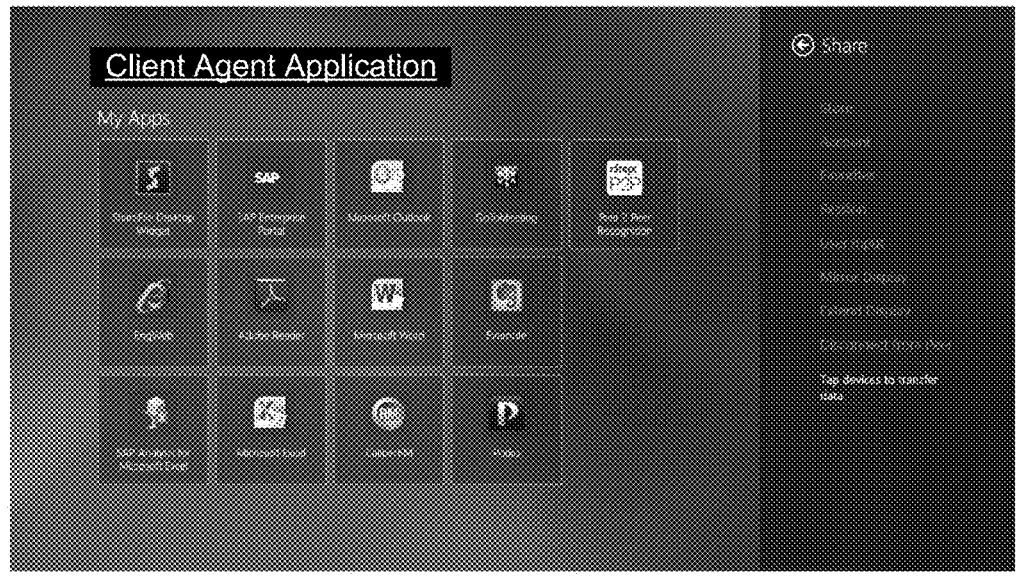
FIGS. 12A-12I are example user interface screens and related diagrams for sharing data and capabilities among multiple devices, in accordance with one or more illustrative aspects described herein.
Figure 12B:
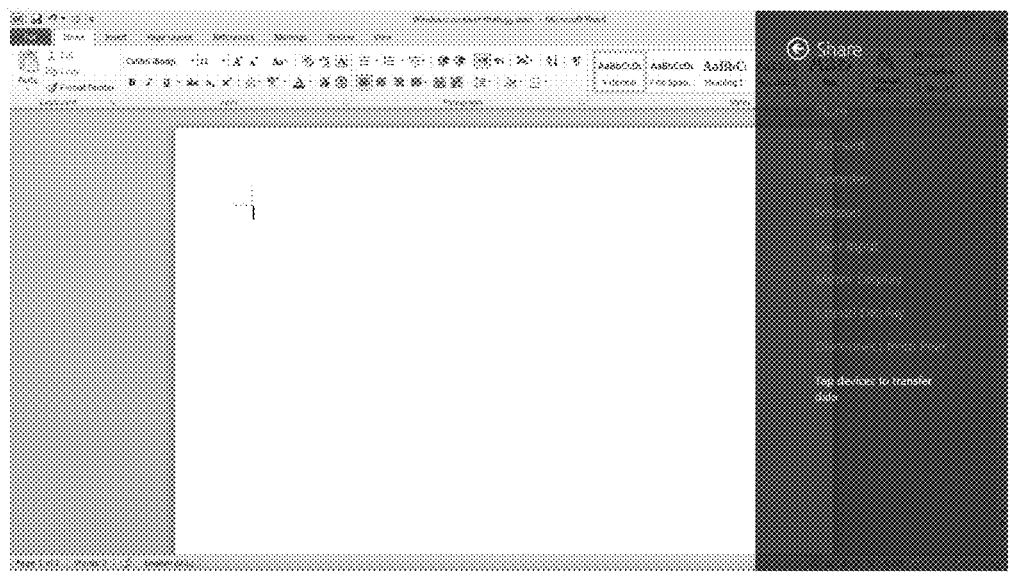

FIGS. 12A-12I are example user interface screens and related diagrams for sharing data and capabilities among multiple devices. FIG. 12A is an example user interface screen of an example client agent application 500. In this example, the client agent application displays a "My Apps" enumeration view, with various options for sharing data and/or capabilities with a peer device (i.e., Store Account, Favorites, Session, User Input, Mirror Display and Extend Display). The user interface in FIG. 12A also includes a message asking the user to tap devices to transfer data, indicating that the user has already selected the type of data and/or capabilities to be shared. FIG. 12B is an example user interface screen showing a remote session view (published Microsoft Word) within an example client agent application 500. The user interface in FIG. 12B also includes options to share data and/or capabilities with a peer device (i.e., Store, Account, Favorites, Session, User Input, Mirror Display and Extend Display). The user interface in FIG. 12B also includes a message asking the user to tap devices to transfer data, indicating that the user has already selected the type of data and/or capabilities to be shared. Thus, as illustrated in these examples, session or application roaming from one device to another may be triggered by a simple tap and use of NFC. Such examples may allow for quick context switching between working in an employee's office, a meeting room, or other physical locations. For instance, in an implementation in a hospital environment, doctors may review patient records on desktop computers in their office, and then may quickly move from their office to a patient's room and view the same information on their mobile devices.

Figure 12C:
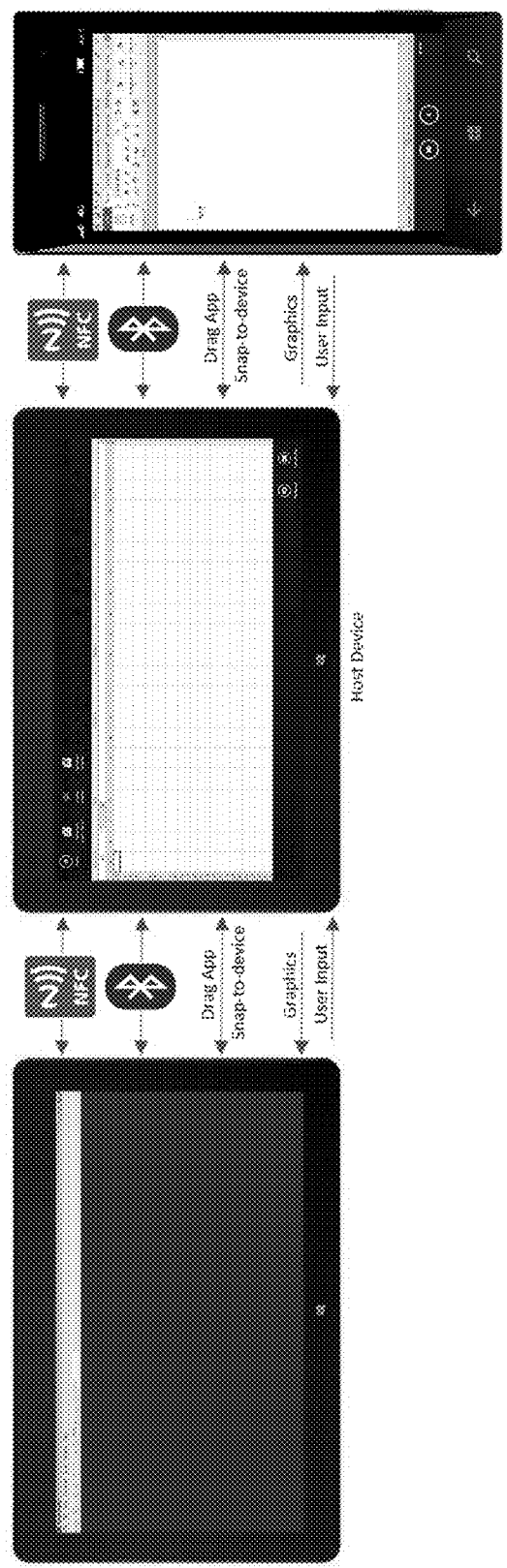

FIG. 12C is a diagram illustrating an instance of a client agent application executing on three paired devices. A remote session view is displayed on the three devices in FIG. 12C, showing that three separate applications are sharing a session. In this example, two of the applications have been dragged from the host device to a paired device, by sharing the output capabilities of the three devices. Adobe Reader has been dragged to user's tablet computer on the left, Microsoft Word has been dragged to user's mobile phone on the right, and Microsoft Excel remains displayed on host device in the center. As indicated by the annotations between devices, the center host device in this example receives user input via Bluetooth from the other two devices, and outputs graphics via Bluetooth to the other two devices. Thus, the capabilities of the devices in FIG. 12C have been combined, allowing these devices to function as a single device with the combined capabilities of all three devices. Such "unified" devices may be built on peer-to-peer communication and/or communication through an enterprise system such as a cloud system, to support context awareness, device discovery and pairing, and capability negotiation.

Figure 12D:
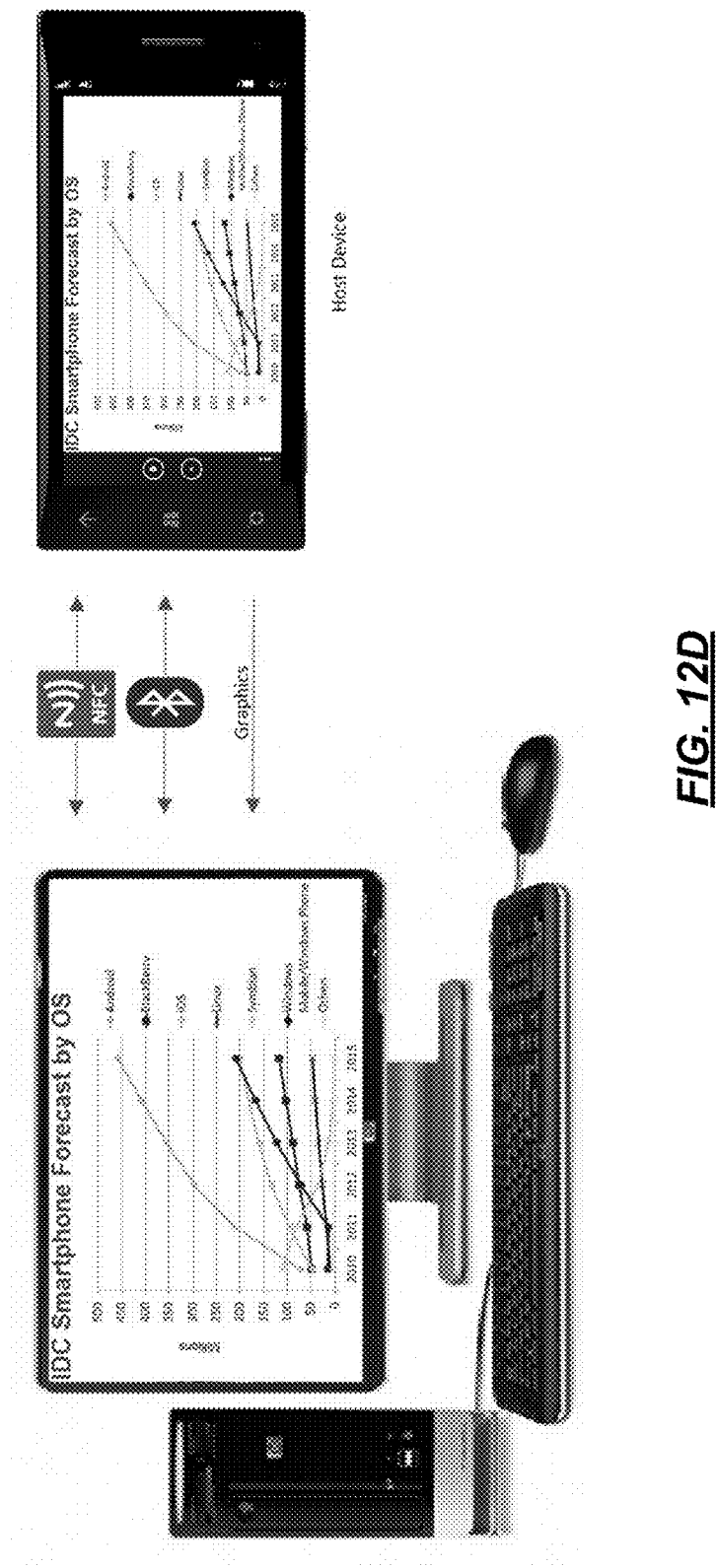
Figure 12E:
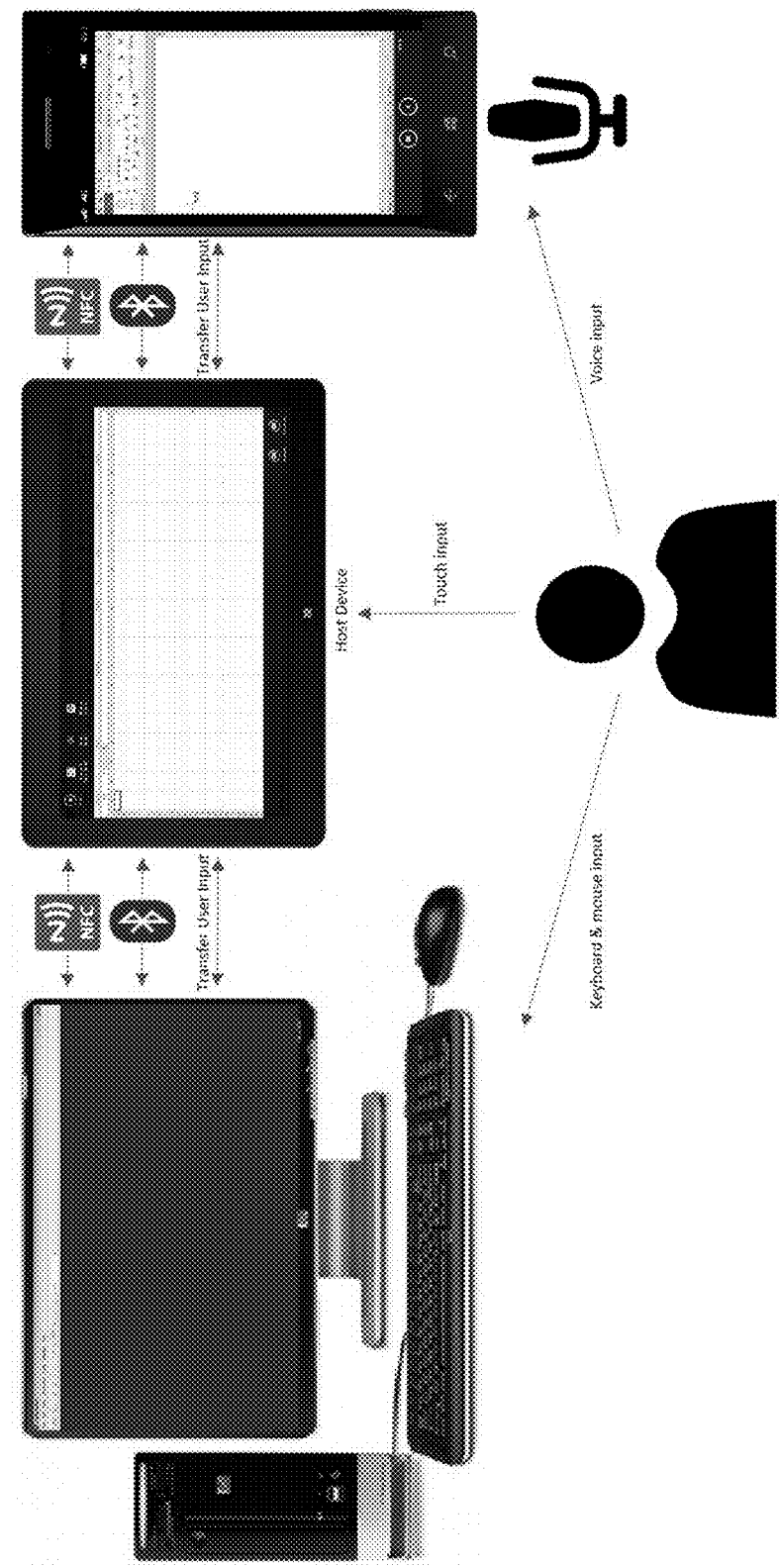

In FIG. 12D, another diagram is shown illustrating the sharing of device capabilities between two devices. In this example, device capability sharing is used to implement display mirroring between the host mobile device and a connected desktop computer. Similarly, in FIG. 12E, a diagram is shown illustrating input sharing between three devices, allowing a user to provide input with the keyboard or mouse from desktop computer, touch screen input from the tablet computer, and voice dictation and commands from the mobile phone.

Figure 12F:
Figure 12G:
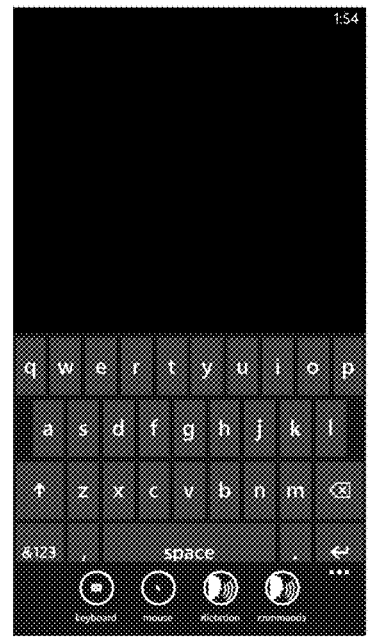
Figure 12H:
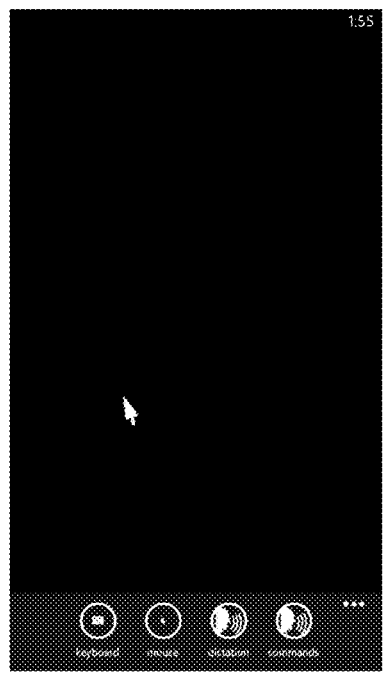
Figure 12I:
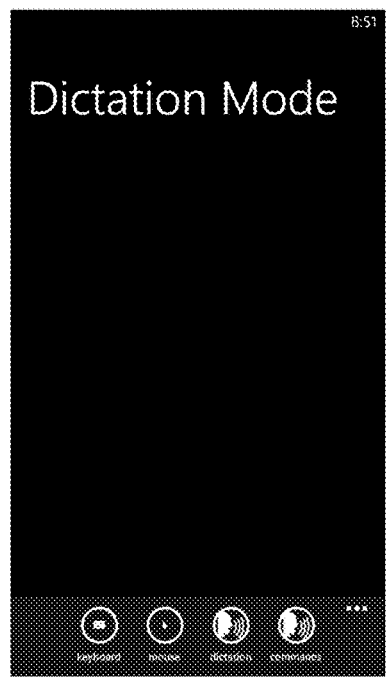

FIGS. 12F-12I show example user interface screens for a mobile device to share device capabilities with one or more peer devices. FIG. 12F shows an example user interface screen of a client agent application 500 on a mobile device. In this example, the client agent application displays a "My Apps" view with options allowing the mobile device user to share capabilities with a peer device. FIGS. 12G-12I show example user interface screens of a client agent application 500 on a mobile device, in which the user input capabilities of the mobile device have been shared with one or more peer devices. In FIG. 12G the client agent 500 is in a keyboard input mode in which the keyboard user input may be transferred to a connected peer device; FIG. 12H the client agent 500 is in a mouse/track pad input mode in which the mouse/track pad user input may be transferred to a connected peer device; and in FIG. 12I the client agent 500 is in a voice dictation input mode in which the voice user input may be transferred to a connected peer device.

Figure 13:
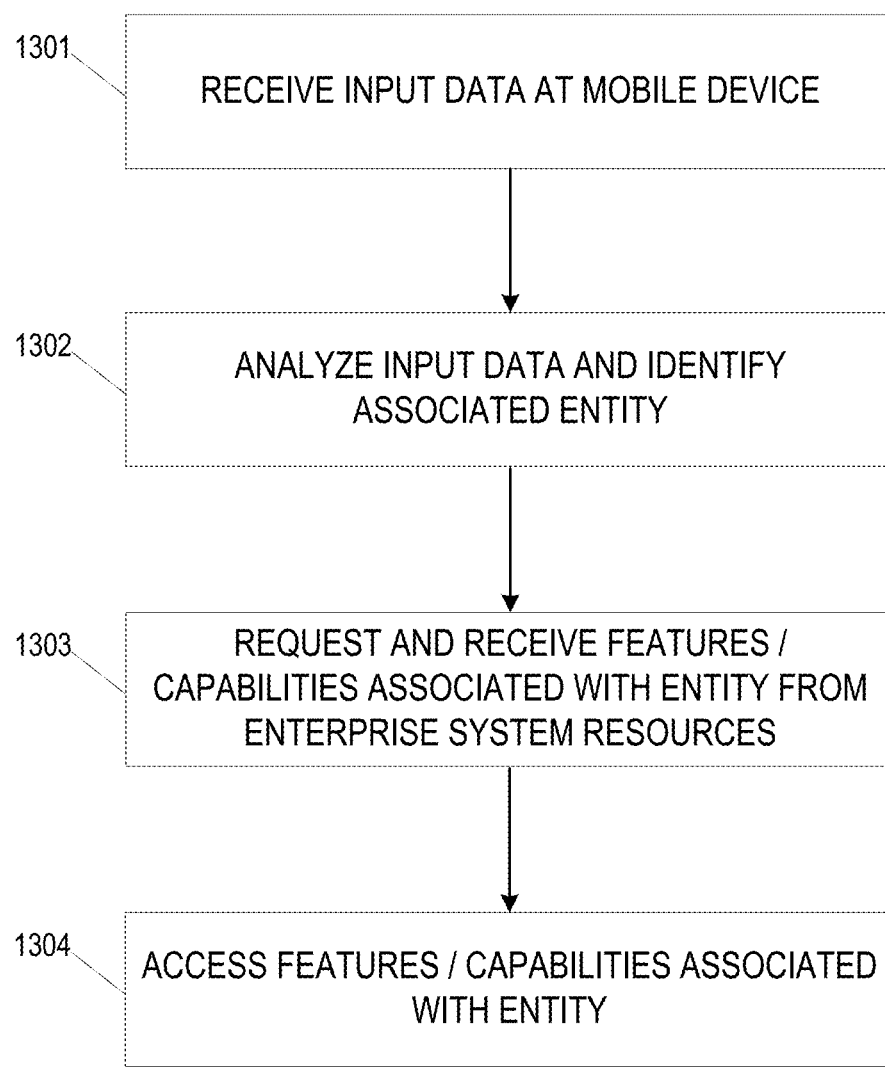
FIG. 13 is a flow diagram illustrating an example process of identifying an individual and accessing features or capabilities associated with the individual by a mobile device, in accordance with one or more illustrative aspects described herein.

Identifying Objects and Accessing Features or Capabilities Associated with the Objects in an Enterprise System FIG. 13 is a flow diagram illustrating example features and methods relating to identifying objects and other entities using a mobile device, and accessing features or capabilities associated with the objects and entities in an enterprise system.

In step 1301, a first computing device (e.g., mobile device 302 or 402) receives input data, for example, from a camera, scanner, or NFC data reader of the mobile device. As discussed below in more detail, the data received in step 1301 may correspond to an object or entity having certain features and capabilities in an enterprise system (e.g., a company network or other cloud system). For example, a user (e.g., a company employee or visitor) may use the camera on their mobile device 302 or 402 to take a picture of an employee's badge (e.g., containing an employee name, employee ID number, and/or picture of the employee) or may use a scanner on their mobile device 302 or 402 to scan the employee's badge. The user also may take a picture of the face of a company employee or visitor, for example, a fellow meeting participant or someone the user has encountered on the company premises. In a hospital setting, a user may use a scanner on their mobile device to scan a patient file or patient wristband having a patent name, bar code, identification number, or the like.

The input received in step 1301 need not correspond to an individual, but also may represent a location or object having some features or capabilities in an enterprise system. For example, the user may scan a room tag, such as an NFC tag, bar code, or other tag located at a company conference room, office, or other location within the company premises. Similarly, an object associated with the enterprise system, such as company vehicle, printer, scanner, projector, phone, computer server, or other computing device may have an NFC tag, bar code, or other tag that may be scanned by a user's mobile device in step 1301. In some examples, such objects need not have tags, and users may instead take a picture of the object (e.g., a conference room or office placard having a name and/or room number, a printer label having a printer network name, a license plate of a company vehicle, etc.), from which the object may be identified. In some examples, the mobile device 302 or 402 may collect GPS data corresponding to a picture taken or object scanned, so that the GPS data may be used to identify the entity or object. For instance, if a user takes a picture of a company printer without any legible printer name or identifier, the user's mobile device may record the location of the printer in GPS coordinates to allow the specific printer to be identified.

In step 1302, the input data received in step 1301 may be analyzed, and the associated individual or object may be identified. In various examples, technologies such as NFC, Image Pattern Recognition (IPR), or Optical Character Recognition (OCR) may be used to identify objects and text input, and facial detection/recognition techniques may be used to recognize any images of individuals received in step 1301. For example, an image of a conference room placard taken with a mobile device camera may be processed using OCR to determine the room name or number, and then text/keyword searching may be performed to identify the conference room within a list of locations or objects (e.g., company resources) within an enterprise system. Similarly, a picture taken by a mobile device user of a fellow meeting participant or other acquaintance may be identified using image processing, facial detection/facial recognition techniques.

In some cases, image data may be analyzed locally by the mobile device 302 that took the image, while in other cases the image data may be transmitted from the mobile device 302 to a service within an enterprise system configured to analyze the data and identify the corresponding individual or object. For instance, a service 308 within the enterprise system may receive image data corresponding to a person's face, and may compare the image data to one or more data sources (e.g., employee identification records, visitor image records, etc.) to determine the identity of the employee or visitor in the image. As another example, a service 308 within the enterprise system may receive image data corresponding to a device (e.g., printer, projector, etc.) or location (e.g., conference room, office, etc.), along with GPS coordinates corresponding to the image, and may use the image and GPS data to determine the specific device(s) or object(s) represented by the picture and/or GPS data which have features and/or capabilities within the enterprise system. Additionally, the data analysis may be performed collaboratively by both the mobile device 302 and one or more enterprise resources 304 or services 309. For example, the mobile device 302 may be configured to determine the type of data that a received image or scanned object corresponds to, for example, a text string corresponding to a room number or room name, an image of individual's face or badge, an image of an object, etc., and then may transmit corresponding data (e.g., a text string, object identifier, image, etc.) to an appropriate enterprise resource or service based on the type of the data. For instance, images of individuals may be transmitted to an employee/visitor facial recognition service 309, text strings representing office or conference room placards may be transmitted to a building directory service 309, images of printers, scanners, projectors, and other devices may be transmitted with GPS coordinates to a building facilities service 309, etc.

In step 1303, after the individual(s) and/or object(s) corresponding to the input received in step 1301 have been identified, various features and capabilities associated with the individual(s) and/or object(s) may be retrieved from various resources and services in the enterprise system. In some examples, single-sign-on (SSO) technology may be used with the client agent application 500 on the mobile device retrieve features and capabilities associated with individuals or objects from a number of different enterprise resources 304 and services 309. For example, if the input data received in step 1301 represents a company employee, then SSO may be used (e.g., over the ActiveSync protocol) to contact an email server (e.g., Microsoft Exchange) and to retrieve contact information, schedule information, and emails relating to the employee (e.g., emails to or from the employee, emails mentioning the employee, etc.). In the context of a hospital or other medical facility, if the input data received in step 1301 represents a patient, then the enterprise system may retrieve the patient's records. As another example, if the input data received in step 1301 represents a conference room, various enterprise resources 304 and services 309 may be used to access the room meeting and vacancy schedule, as well as the features and capabilities (e.g., seating size, projectors and presentation equipment, etc.) of the conference room. If the input data received in step 1301 represents a printer, scanner, projector, or other computing device, various enterprise resources 304 and services 309 may be used to determine the device name, location, network address, features and capabilities, and the like.

In step 1304, the various features and capabilities retrieved in step 1303 may be presented to the user via the user's mobile device 302, allowing the user to access these features and capabilities immediately via their mobile device. As discussed above, the features and capabilities available to the mobile device user may depend on the type of the entity or object, the features and capabilities supported by the various enterprise resources 304 and services 309 with respect to the entity or object, and authentication credentials associated with the mobile device user and the entity or object, among other factors. If the input data received in step 1301 represents a company employee, and if the contact information and other employee information was retrieved in step 1303, then in step 1304 the employee information may be presented to the user on the mobile device along with various related functionality, such as an option to add the employee to the user's contacts, call the employee, send an email to the employee, schedule the employee for a meeting, invite the employee to join a meeting or collaborative work session, and the like. In the context of a hospital or medical facility, if the input data received in step 1301 represents a patient, and if the patient information was retrieved in step 1303, then in step 1304 the patient data may be presented to the user via the user's mobile device 302. As another example, if the input data received in step 1301 represents a printer, scanner, projector, or other device, and if device information was retrieved in step 1303, then in step 1304 the device information may be presented to the user via the user's mobile device 302 (e.g., device capabilities, status, schedule, etc.), along with various related functionality, such as an option to connect to the device or install a driver for the device, an option to reserve or schedule the device during a time window, or various options to directly or indirectly control the device.

In certain embodiments, an augmented reality (AR) user experience may be presented to users by combining a reality view (e.g., image or video input) with public and/or private information associated with the entity or object for which user input was received in step 1301 and additional enterprise data was retrieved in step 1303. For example, augmented reality may be used to overlay in real-time a real-world environment, such as a person's face, badge, conference room tag, printer, etc., with computer-generated data retrieved in step 1303, such as a user's contact data, meeting schedule, status, chat logs, or any other information retrieved in step 1303 from an enterprise resource or service. Augmented reality also may be used to augment a view of a device, such as a printer, projector, or the like, with a computer-generated list of the device identity, status, features, and capabilities. In other examples, augmented reality technologies need not be used, and a stand-alone user interface may be presented instead in step 1304.

Different sets of features/capabilities for the object or entity may be presented to the mobile device user in step 1304, depending on a level of access determined for the mobile device user with respect to the object or entity. In some cases, the user of the mobile device 302 may be required to provide authentication credentials and may be authenticated by the enterprise system before any features/capabilities may be provided to the user. Additionally, different levels of access permissions and corresponding sets of features/capabilities may be maintained by the enterprise system for individuals (e.g., company employees, visitors, etc.) and objects (e.g., conference rooms, files, printers, etc.) associated with the company or enterprise system.

Information, features, and capabilities associated with individuals and objects may be designated as "public" or "private" in some cases, or may be assigned more specific and granular sets of user permissions that may be used to control access to the information, features, and capabilities of the entity or object. For example, after a visitor or non-authorized user to a company takes a picture of an employee's face or badge, the visitor may receive via their mobile device 302 a set of basic and public information, such as the employee's name and work contact information. In contrast, if a user with additional authorized access, such as another employee or manager at the company, takes the same picture of the employee's face or badge, the authorized user may receive additional information, such as the employee's mobile number, office telephone number, schedule, supervisor information, employment history, and other information that might not be made available to visitors and non-authorized users. Similarly, the information, features, and capabilities associated with objects may be designated as "public" or "private" or may be assigned specific user permissions to control access to the different information, features, and capabilities based on the identity and credentials of the mobile device user requesting the data. For instance, visitors, temporary employees, interns, and certain groupings of employees (e.g., by level, title, department, etc.) in a company may be assigned one level of access to objects, such as access to view the schedule and capabilities of a conference room, access to read a company file or record, and access to print a document on a specific printer. Different employees or different categories of users in this example may have different levels of access to the same objects. For example, higher level employees and/or technical personnel may have access to schedule and request additional equipment for the conference room, access to modify or remove the company file or record, or access to restart or reconfigure a printer, etc. Thus, when retrieving the information, features, and capabilities associated with an entity/object in step 1303, and when presenting the information, features, and capabilities to the user in step 1304, the client agent application 500 on the mobile device and/or the enterprise system may confirm the user's authentication credentials, and may present only the set of information, features, and capabilities authorized for the user.

When accessing features and capabilities associated with an object in step 1304, the user may invoke various features and capabilities directly (e.g., using peer-to-peer communication between the user's mobile device and the object), or indirectly (e.g., via the cloud system/enterprise resources and services). For example, in step 1304 a user may be presented with a capability to reboot or reconfigure a device, such as a company printer or server. This capability may be invoked from the user's mobile device, via the client agent application 500. In some cases, the user's mobile device may communicate directly with the object, using NFC, Bluetooth, Wi-Fi, etc., to instruct the object to reboot or reconfigure. In some cases, access to the object may be secure, and one or more enterprise resources 304 or services 309 may first provide the user's mobile device 302 with an access code or password to enable the user's mobile device to control the object via direct communication. In other examples, the user may send a request via the client agent 500 to the enterprise system to invoke a capability of an object. The enterprise system may receive and (optionally) validate the request, and then may control the object using the relevant enterprise servers and access gateways.

Figure 14:
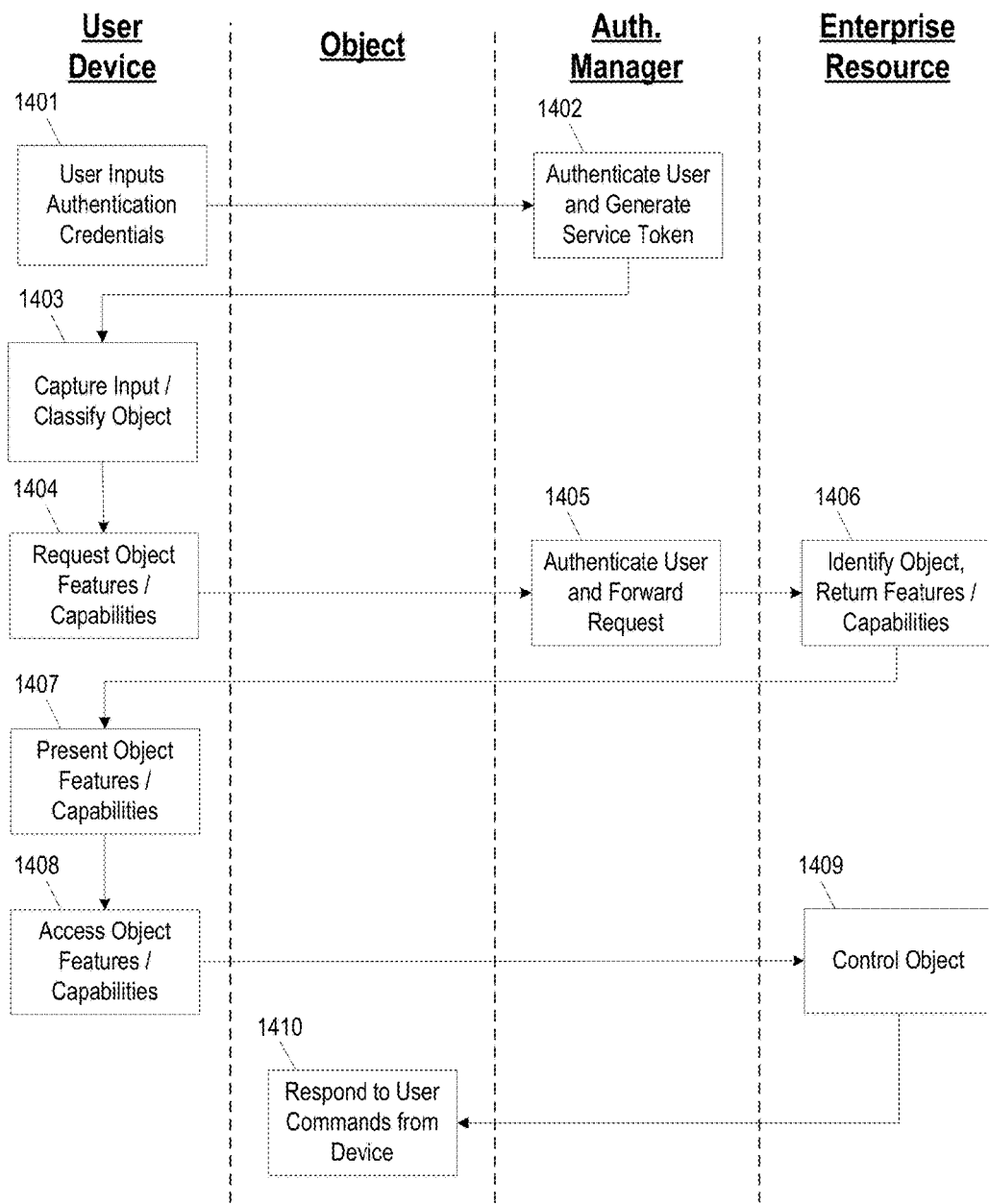
FIG. 14 is a diagram illustrating an example technique of identifying an object and accessing features or capabilities associated with the object, in accordance with one or more illustrative aspects described herein.

FIG. 14 is flow diagram illustrating an example in which a user device (e.g., a mobile device, desktop computer, etc.) receives input corresponding to an object and interacts with various components of enterprise system to identify the object, retrieve features and capabilities associated with the object, and access the features and capabilities. The steps of FIG. 14 may correspond to one or more specific examples of steps 1301-1304, where a user device is used to identify an object associated with a company cloud system or other enterprise system, and access features and capabilities of the object.

In step 1401, a user inputs authentication credentials into a computing device (e.g., mobile device, desktop computer, etc.) in order to login to an enterprise system. In certain examples, the user may input authentication credentials via a client agent application 500 or other software application running on the device. The client agent 500 may transmit the user's credentials to an authentication manager of the enterprise system, and in step 1402 the authentication manager may authenticate, generate a service token, and transmit the service token back to the user device.

In step 1403, the user device may capture input and, in some cases, classify an object type (and/or identify the specific object) corresponding to the captured input. As discussed above, the captured input may be NFC data, image data, video data, bar code data, or other types of data representing one or more individuals or objects. The captured input also may include location data (e.g., GPS coordinates) to facilitate the identification of the individuals or objects. The classification of the object in step 1403 may be performed by the user device (as shown in FIG. 14), by resources or services in the enterprise system, external resources, or by a combination of the user device, the enterprise system, and external resources. For example, as discussed above, OCR and a building directory service 309 may be used to identify certain objects (e.g., offices, conference rooms), an NFC reader may be used to identify other objects (e.g., NFC tagged locations, files, and devices), facial detection and facial recognition may be used to identify other objects (e.g., images of faces or employee badges), and so on. For example and without limitations, in some embodiments on the iOS platform, the client agent 500 may create an audio-video capture session object, AVCaptureSession, which mediates and coordinates the flow between inputs (AVCaptureInput objects) and outputs (AVCaptureOutput objects) to perform real-time input capture and rendering. The client agent 500 may also create a CIDetector object, which uses image processing to look for specific features in an image. The CIDetector object may be instantiated with type CIDetectorTypeFace in order to detect a face in an image, as well as the facial features. The featuresInImage method of the CIDetector object may be used to retrieve an array of features, e.g. in the form of CIFeature objects, after processing and searching an image. A CIFeature object may represent a portion of an image that matches the criteria of the CIDetector object. Subclasses of CIFeature, e.g. CIFaceFeature, may hold additional information specific to the detector that discovered the feature. For example, a CIFaceFeature object may describe a face detected in a picture. The properties of a CIFaceFeature object may also provide locations for the face's eyes and mouth, which at a later step may be useful in the proper positioning of an AR view with the public and/or private information associated with the face for which input was received. As another example and without limitations, in some embodiments the Puma.NET open source OCR SDK may be used by the client agent 500 to load an image, optionally configure language and font settings, and convert the image into recognized text.

In step 1404, the user device may request the features and capabilities associated with the object from the enterprise system. The request in step 1404 may include one or more distinguishing features of the object for which the input data was captured in step 1403. Such distinguishing features may include, for example, an image of an employee face or badge, an office or conference room number, an image of a printer and corresponding location coordinates, etc. The user device also may determine and transmit the object type (e.g., facial image, device location, room number, file or record number, etc.) to allow the enterprise system to route the request to an appropriate enterprise resource. Additionally, in some cases, the user device may transmit a previously-received service token with the request in the step 1404, or may otherwise provide authentication credentials to the authentication manager.

In step 1405, the authentication manager may authenticate the user with the previously-received service token or other authentication credentials, and may use the object type and/or the distinguishing features of the object sent by the user device in step 1404, to route the request to an appropriate enterprise resource. For example, facial images may be routed to an employee image database and/or visitor image database so that the image can be identified, a room number may be routed to a building directory server, a printer image and location may be routed to a building facilities service, and so on.

In 1406, the enterprise resource (which may consist of a single resource or a combination of resources and services) may analyze the request and identify the specific entity/object from the data in the request (e.g., a company employee, room or location, file, device, vehicle, etc.), assuming that the specific object has not already been identified by the user device in step 1403. After the specific object has been identified, the enterprise resource may retrieve the features and capabilities associated with the object, based on the authorization credentials of the user device. If the object corresponds to an image of a company employee, then the enterprise resources used in step 1406 may include a company email server, employee database, and/or other resources that may contain information about the employee. If the object corresponds to a company device (e.g., computer server, printer, etc.) then the enterprise resources used in step 1406 may include a device manager and application controller capable of retrieving the features of the device and controlling the device.

In step 1407, the enterprise resource(s) may transmit the features and capabilities associated with the object, back to the user device. As mentioned above, different users may have different levels of permissions to view information about an individual or object, and to access the features and capabilities associated with an individual or object. Thus, the features and capabilities presented to the user in step 1407 may be based on the user's identity and authentication credentials. In step 1408, the user may access various features and capabilities associated with the object, using their device. The client agent 500 or other software application may provide the user interface and/or may automatically launch applications to allow the user to access the features and capabilities associated with the object. In some examples, the user device may provide an augmented reality (AR) user experience view by combining the features and capabilities received from the enterprise resource(s) with a reality view (e.g., image or video input) associated with the object.

In step 1409, one or more enterprise resources receive a request from the user device, via the client agent 500, to control the object. Although not shown in FIG. 14, the request may include protocol commands sent back and forth between the user device, the authentication manager, and the enterprise resources. The enterprise resource may control the object by issuing commands to the object via the access gateway. For example, within a company network and cloud system implementation, the company network servers and other back-end servers may control devices on the company's network, such as printers, servers, phones, etc., and may access data from the company's email servers, file servers, web servers, etc. In step 1410, the device receives and acts on the user's request, sent via the enterprise resource, thereby providing the user with the features and capabilities associated with the object. As discussed above, in other examples, the user device may be configured to communicate directly with the object (e.g., using direct peer-to-peer communication), rather than making requests indirectly through the enterprise resource.

Figure 15A:
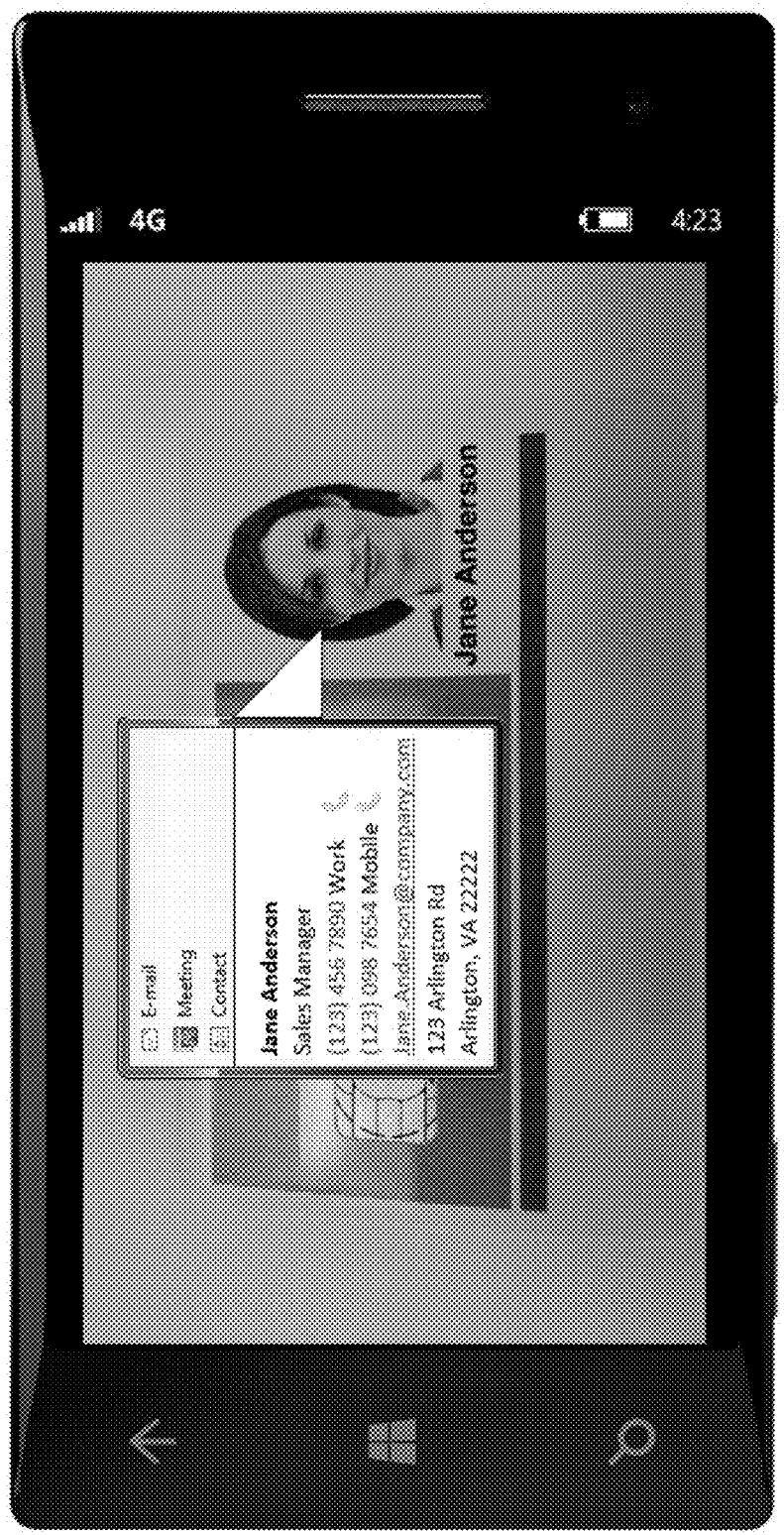
FIGS. 15A-C are example user interface screens for identifying an object and accessing features or capabilities associated with the object, in accordance with one or more illustrative aspects described herein.
Figure 15B:
Figure 15C:
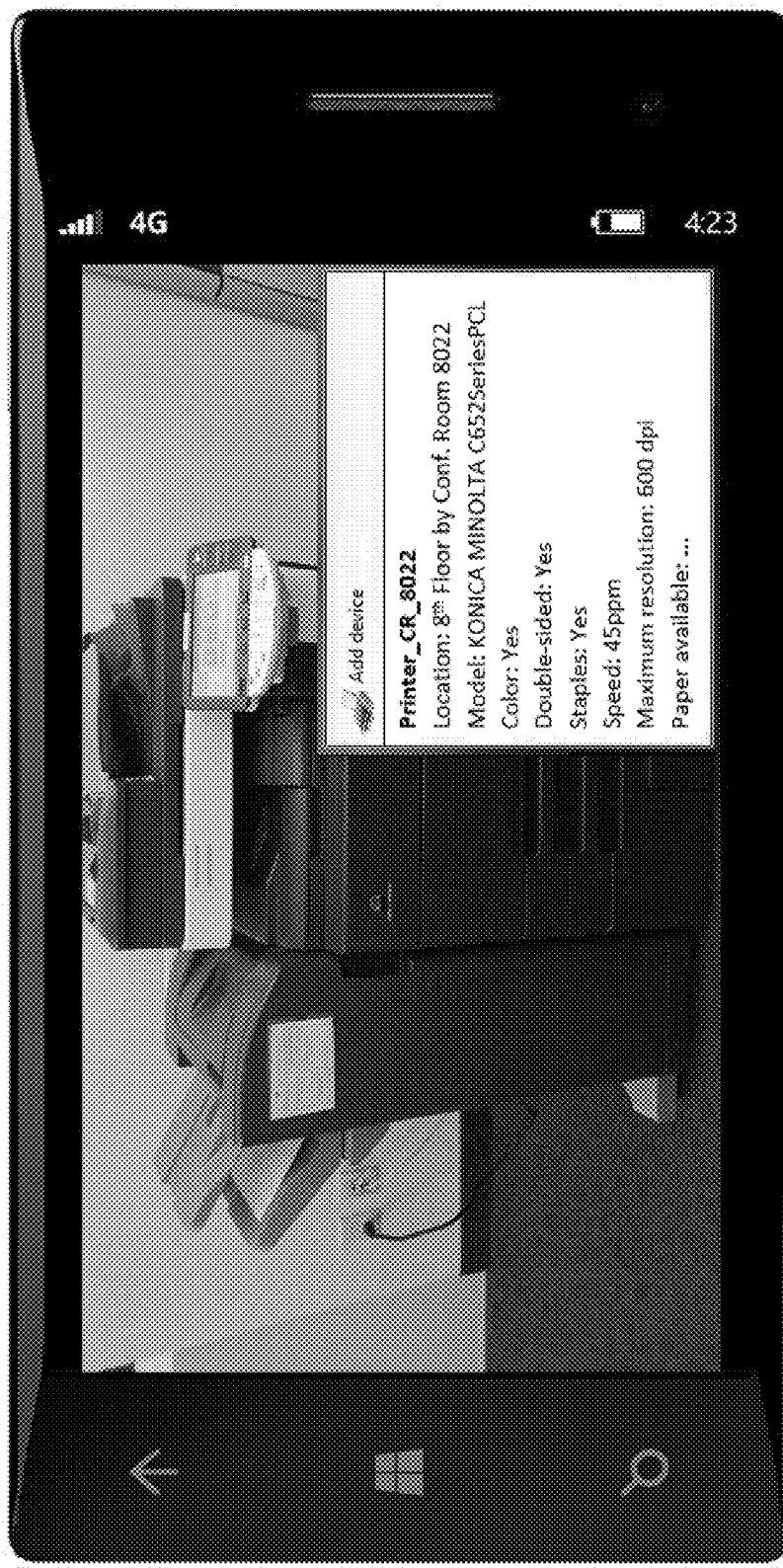

FIGS. 15A-C are example user interface screens showing features and capabilities associated with certain entities and objects in an enterprise system that may be identified and accessed by a user via a mobile device. Specifically, FIGS. 15A-15C illustrate specific examples within an implementation of steps 1301-1304 and/or 1401-1410, in which a user at a mobile device captures input data corresponding to an individual or object, and communicates with an enterprise system to identify the individual or object, and to retrieve and provide the user with various features and capabilities associated the individual or object.

In the example user interface screen shown in FIG. 15A, the user of the mobile device may have recently taken a picture of another employee's identification badge during a meeting. After identifying the employee using OCR and/or facial recognition techniques, the client agent 500 on the mobile device may access the company's resources (e.g., using a single sign on (SSO) over the ActiveSync protocol), to retrieve the employee's information via an email server or company directory server. In FIG. 15A, the employee's information is displayed in an augmented reality view along with the image of the employee's identification badge, and options allowing the user to send the employee an e-mail, invite the employee to a meeting, call the employee, or add the employee to the mobile device user's list of contacts.

In the example shown in FIG. 15B, the user of the mobile device may have recently taken a picture of a conference room placard. The conference room number may be identified using OCR and/or GPS coordinates associated with the image that were captured by the mobile device. The client agent 500 then may access the company's resources (e.g., using a single sign on (SSO) over the ActiveSync protocol), to retrieve information regarding the conference room, for example, from a company email server, scheduling system, or company resources directory. In FIG. 15B, the conference room information is displayed in an augmented reality view along with the image of the conference room placard, and an option allowing the user to reserve the conference room.

In the example shown in FIG. 15C, the user of the mobile device may have recently taken a picture of an office printer on a company's premises. In this example, the specific printer may be identified using one or more of NFC (if the printer includes an NFC tag or is NFC-capable), GPS, IPR, and/or OCR. After identifying the printer, the client agent 500 then may access the company's resources (e.g., using a single sign on (SSO) over the ActiveSync protocol), to retrieve information regarding the printer, for example, from a company device manager. In FIG. 15C, the printer information is displayed in an augmented reality view along with the image of the printer, and an option allowing the user to add the printer as one of the user's devices within the user's mobile device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described and/or illustrated herein may be performed in other than the recited order, and that one or more steps illustrated may be optional in accordance with aspects of the disclosure. Modifications may be made, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the aspects described herein.

The invention claimed is:

1. A method comprising:
   determining, by a first mobile computing device, that the first mobile computing device is located proximate to a second computing device;
   establishing, by the first mobile computing device, a near-field communication session with the second computing device, wherein the near-field communication session transmits communications via an electromagnetic field;
   transmitting, by the first mobile computing device and via the near-field communication session, a first set of device capabilities to the second computing device, wherein the second computing device is incapable of performing at least one capability of the first set of device capabilities;
   receiving, by the first mobile computing device and via the near-field communication session, a second set of device capabilities from the second computing device;
   establishing, by the first mobile computing device and using the near-field communication session, a persistent, long-range communication session with the second computing device;
   sharing, by the first mobile computing device, the at least one capability of the first set of device capabilities with the second computing device, via the persistent, long-range communication session;
   receiving, at the first mobile computing device, user input from the second computing device over the persistent, long-range communication session;
   modifying, at the first mobile computing device, the received user input by converting the user input according to the first set of device capabilities, wherein said conversion comprises at least one of: converting touch events to mouse events or vice versa; converting touch events to keyboard events or vice versa; or converting motion or orientation events to touch events or vice versa;
   designating a third computing device to output data received from one or more of the first mobile computing device or the second computing device; and
   causing, based on the designation, the third computing device to drop input received from a user at the third computing device.

2. The method of claim 1, further comprising:
   receiving, at the first mobile computing device, user input selecting the first set of device capabilities for sharing from a larger set of device capabilities available for sharing at the first mobile computing device.

3. The method of claim 2, wherein the user input selecting the first set of device capabilities for sharing is received before determining that the first mobile computing device is proximately located to the second computing device.

4. The method of claim 2, wherein the user input selecting the first set of device capabilities for sharing is received after determining that the first mobile computing device is proximately located to the second computing device, and wherein the selected first set of device capabilities to share is specific to the persistent, long-range communication session with the second computing device.

5. The method of claim 1, wherein the persistent, long-range communication session comprises a two-way sharing communication session between the first mobile computing device and the second computing device, and wherein said sharing comprises:
   persistently transmitting data to the second computing device over a first time period, the transmitted data corresponding to a first device capability out of the first set of device capabilities; and
   persistently receiving data from the second computing device over the first time period, the received data corresponding to a second device capability out of the second set of device capabilities.

6. The method of claim 1, further comprising:
   receiving, at the first mobile computing device, user input authorizing one-way sharing of device capabilities with the second computing device but not authorizing two-way sharing of device capabilities with the second computing device, and wherein the sharing comprises a one-way sharing session of device capabilities in accordance with the user input.

7. The method of claim 1, further comprising:
   determining that the first mobile computing device is located proximate to a-the third computing device;
   transmitting the first set of device capabilities to the third computing device;
   receiving a third set of device capabilities from the third computing device; and
   establishing a second persistent, long-range communication session with the third computing device,
   wherein said sharing comprises sharing one or more device capabilities with the second computing device using the persistent, long-range communication session, and sharing one or more additional device capabilities with the third computing device using the second persistent, long-range communication session, during a same time period.

8. The method of claim 1, wherein transmitting the first set of device capabilities to the second computing device comprises transmitting data identifying one or more input or output functional capabilities of the first mobile computing device, including at least one of: data identifying a number of display screens on the first mobile computing device; data identifying a size of a display screen of the first mobile computing device; data identifying a touch screen capability of the first mobile computing device; data identifying a peripheral input or output device connected to the first mobile computing device; data identifying a camera capability of the first mobile computing device, data identifying a microphone capability of the first mobile computing device, or data identifying a speech recognition capability of the first mobile computing device.

9. The method of claim 1, wherein transmitting the first set of device capabilities to the second computing device comprises transmitting data identifying one or more application sessions executing at the first mobile computing device, the method further comprising:
   determining that the one or more application sessions have been started at the second computing device; and
   terminating the one or more application sessions at the first mobile computing device.

10. The method of claim 9, wherein said one or more application sessions are virtual application sessions, and wherein starting the one or more application sessions at the second computing device comprises configuring a client agent application on the second computing device to allow access to the one or more virtual application sessions.

11. The method of claim 1, wherein converting comprises dropping at least a portion of the user input based on a lack of an ability by the first mobile computing device.

12. The method of claim 1, wherein a device capability of the first set of device capabilities that is shared by the first mobile computing device with the second computing device is touch screen input capability.

13. The method of claim 1, wherein a device capability of the first set of device capabilities that is shared by the first mobile computing device with the second computing device is video display output capability.

14. The method of claim 1, wherein the conversion comprises at least one of:
converting touch events to keyboard events or vice versa; or
converting motion or orientation events to touch events or vice versa.

15. A mobile computing device comprising:
one or more processors; and
memory storing instructions that, when executed by the one or more processors, cause the mobile computing device to:
determine that the mobile computing device is located proximate to a second computing device;
establish, by the mobile computing device, a near-field communication session with the second computing device, wherein the near-field communication session transmits communications via an electromagnetic field;
transmit a first set of device capabilities to the second computing device and via the near-field communication session, wherein the second computing device is incapable of performing at least one capability of the first set of device capabilities;
receive a second set of device capabilities from the second computing device and via the near-field communication session;
establish, using the near-field communication session, a persistent, long-range communication session with the second computing device;
share, via the persistent, long-range communication session, the at least one capability of the first set of device capabilities with the second computing device;
receive first user input from a user of the mobile computing device;
receive second user input from the second computing device over the persistent, long-range communication session;
converting the second user input according to the first set of device capabilities, wherein said conversion comprises at least one of: converting touch events to mouse events or vice versa; converting touch events to keyboard events or vice versa; converting voice data to text data or vice versa; or converting motion or orientation events to touch events or vice versa;
designate a third computing device to output data received from one or more of the mobile computing device or the second computing device; and
cause, based on the designation, the third computing device to drop input received from a user at the third computing device.

16. The mobile computing device of claim 15, wherein the instructions, when executed by the one or more processors, cause the mobile computing device to receive user input selecting the first set of device capabilities for sharing before determining that the mobile computing device is proximately located to the second computing device.

17. The mobile computing device of claim 15, wherein the instructions, when executed by the one or more processors, cause the mobile computing device to receive user input selecting the first set of device capabilities for sharing after determining that the mobile computing device is proximately located to the second computing device, and wherein the selected first set of device capabilities to share is specific to the persistent, long-range communication session with the second computing device.

18. The mobile computing device of claim 15, wherein the persistent, long-range communication session comprises a two-way sharing communication session between the mobile computing device and the second computing device, and wherein said sharing comprises:
persistently transmitting data to the second computing device over a first time period, the transmitted data corresponding to a first device capability out of the first set of device capabilities; and
persistently receiving data from the second computing device over the first time period, the received data corresponding to a second device capability out of the second set of device capabilities.

19. The mobile computing device of claim 15, wherein the instructions, when executed by the one or more processors, further cause the mobile computing device to:
receive user input authorizing one-way sharing of device capabilities with the second computing device but not authorizing two-way sharing of device capabilities with the second computing device, and wherein the sharing comprises a one-way sharing session of device capabilities in accordance with the user input.

20. The mobile computing device of claim 15, wherein the instructions, when executed by the one or more processors, further cause the mobile computing device to:
determine that the mobile computing device is located proximate to the third computing device;
transmit the first set of device capabilities to the third computing device;
receive a third set of device capabilities from the third computing device; and
establish a second persistent, long-range communication session with the third computing device,
wherein said sharing comprises sharing, during a same time period, one or more device capabilities with the second computing device using the persistent, long-range communication session and sharing one or more additional device capabilities with the third computing device using the second persistent, long-range communication session.

21. The mobile computing device of claim 15, wherein transmitting the first set of device capabilities to the second computing device comprises transmitting data identifying one or more input or output functional capabilities of the mobile computing device, including at least one of: data identifying a number of display screens on the mobile computing device; data identifying a size of a display screen of the mobile computing device; data identifying a touch screen capability of the mobile computing device; data identifying a peripheral input or output device connected to the mobile computing device; data identifying a video display capability of the mobile computing device; data identifying a camera capability of the mobile computing device, data identifying a microphone capability of the mobile computing device, or data identifying a speech recognition capability of the mobile computing device.

22. The mobile computing device of claim 15, wherein transmitting the first set of device capabilities to the second computing device comprises transmitting data identifying one or more application sessions executing at the mobile computing device, wherein the memory stores instructions that, when executed by the one or more processors, cause the mobile computing device to:
- determine that the one or more application sessions have been started at the second computing device; and
- terminate the one or more application sessions at the mobile computing device.

23. A method comprising:
- determining, by a first mobile computing device, that the first mobile computing device is located proximate to a second computing device;
- establishing, by the first mobile computing device, a near-field communication session with the second computing device, wherein the near-field communication session transmits communications via an electromagnetic field;
- transmitting, by the first mobile computing device and via the near-field communication session, a first set of device capabilities to the second computing device;
- receiving, by the first mobile computing device and via the near-field communication session, a second set of device capabilities from the second computing device;
- establishing, by the first mobile computing device and using the near-field communication session, a persistent, long-range communication session with the second computing device;
- sharing, by the first mobile computing device, at least one of the first set of device capabilities or the second set of device capabilities with the second computing device, via the persistent, long-range communication session;
- receiving, at the first mobile computing device, user input from the second computing device over the persistent, long-range communication session;
- modifying, at the first mobile computing device, the received user input by converting the user input according to the first set of device capabilities, wherein said conversion comprises at least one of: converting touch events to mouse events or vice versa; converting touch events to keyboard events or vice versa; or converting motion or orientation events to touch events or vice versa;
- designating a third computing device to output data received from one or more of the first mobile computing device or the second computing device; and
- causing, based on the designation, the third computing device to drop input received from a user at the third computing device;
- wherein, utilization of a device capability shared by the first mobile computing device with the second computing device uses only information local to the first mobile computing device at the time of requested sharing.

* * * * *